US012654442B2

(12) United States Patent
Suzuki

(10) Patent No.: US 12,654,442 B2
(45) Date of Patent: Jun. 16, 2026

(54) LIQUID DISCHARGE APPARATUS, LIQUID DISCHARGE METHOD, AND METHOD FOR PRODUCING HEAD UNIT

(71) Applicant: Takuya Suzuki, Kanagawa (JP)

(72) Inventor: Takuya Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 130 days.

(21) Appl. No.: 18/607,616

(22) Filed: Mar. 18, 2024

(65) Prior Publication Data

US 2024/0316920 A1 Sep. 26, 2024

(30) Foreign Application Priority Data

Mar. 23, 2023 (JP) ................................ 2023-047065

(51) Int. Cl.

*B41J 2/045* (2006.01)
*B41J 2/145* (2006.01)
*B41J 2/16* (2006.01)

(52) U.S. Cl.

CPC ........... *B41J 2/04581* (2013.01); *B41J 2/145* (2013.01); *B41J 2/1612* (2013.01); *B41J 2/1632* (2013.01)

(58) Field of Classification Search

CPC ........ B41J 2/155; B41J 2/2132; B41J 2/2146; B41J 2/2139; B41J 2/145; B41J 2202/21; B41J 2/2121; B41J 2/04581; B41J 2/1612
See application file for complete search history.

(56) References Cited

U.S. PATENT DOCUMENTS

| | | | |
|---|---|---|---|
| 2013/0182027 A1 | 7/2013 | Wakui | |
| 2016/0193829 A1 | 7/2016 | Yamanobe | |
| 2020/0398554 A1 | 12/2020 | Suzuki et al. | |

FOREIGN PATENT DOCUMENTS

| | | | |
|---|---|---|---|
| CN | 1575990 | A | 2/2005 |
| JP | 2009-274233 | A | 11/2009 |
| JP | 2020-040334 | A | 3/2020 |
| JP | 2022-042250 | A | 3/2022 |

OTHER PUBLICATIONS

Extended European Search Report issued Aug. 7, 2024 in European Patent Application No. 24163932.7, 9 pages.
The First Office Action mailed Apr. 21, 2026, in Chinese Application No. 202410283665.1, 19 pages including English translation.

*Primary Examiner* — Jannelle M Lebron
(74) *Attorney, Agent, or Firm* — XSENSUS LLP

(57) ABSTRACT

A liquid discharge apparatus includes a plurality of nozzle arrays and circuitry. The nozzle arrays discharge a plurality of droplets having different volumes onto a recording medium at mutually different times. The circuitry controls a discharge operation to discharge the droplets. The circuitry causes a nozzle array of the nozzle arrays to discharge a droplet, of the droplets, of a first reference amount, and causes another nozzle array of the nozzle arrays to discharge a droplet, of the droplets, of a second reference amount greater than the first reference amount to land later than the droplet of the first reference amount.

14 Claims, 14 Drawing Sheets

LIQUID DISCHARGE APPARATUS, LIQUID DISCHARGE METHOD, AND METHOD FOR PRODUCING HEAD UNIT

CROSS-REFERENCE TO RELATED APPLICATION

This patent application is based on and claims priority pursuant to 35 U.S.C. § 119(a) to Japanese Patent Application No. 2023-047065, filed on Mar. 23, 2023, in the Japan Patent Office, the entire disclosure of which is hereby incorporated by reference herein.

BACKGROUND

Technical Field

Embodiments of the present disclosure relate to a liquid discharge apparatus, a liquid discharge method, and a method for producing a head unit.

Related Art

Techniques for enhancing the image quality have been provided for liquid discharge apparatuses including a plurality of nozzle arrays. Such techniques include preventing the movement of dots due to the interference of droplets after landing on a recording medium and outputting an image in which banding is hardly recognized.

SUMMARY

According to an embodiment of the present disclosure, a liquid discharge apparatus includes a plurality of nozzle arrays and circuitry. The plurality of nozzle arrays discharge a plurality of droplets having different volumes onto a recording medium at mutually different times. The circuitry controls a discharge operation to discharge the plurality of droplets. The circuitry causes a nozzle array of the plurality of nozzle arrays to discharge a droplet, of the plurality of droplets, of a first reference amount, and causes another nozzle array of the plurality of nozzle arrays to discharge a droplet, of the plurality of droplets, of a second reference amount greater than the first reference amount to land later than the droplet of the first reference amount.

According to an embodiment of the present disclosure, a liquid discharging method for causing a plurality of nozzle arrays to discharge a plurality of droplets having different volumes onto a recording medium at mutually different times includes causing a nozzle array of the plurality of nozzle arrays to discharge a droplet, of the plurality of droplets, of a first reference amount, and causing another nozzle array of the plurality of nozzle arrays to discharge a droplet, of the plurality of droplets, of a second reference amount greater than the first reference amount to land later than the droplet of the first reference amount.

According to an embodiment of the present disclosure, a method for producing a head unit includes assembling and disposing. The assembling is assembling a plurality of discharge heads each including a nozzle array. The nozzle array includes a plurality of nozzles. The plurality of discharge heads includes a first discharge head and a second discharge head. The first discharge head includes the plurality of nozzles to discharge a plurality of droplets with a small variation in amount discharged. The second discharge head includes the plurality of nozzles to discharge a plurality of droplets with a large variation in amount discharged. The disposing is disposing the first discharge head and the second discharge head downstream from the first discharge head in a conveyance direction in which a recording medium is conveyed.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
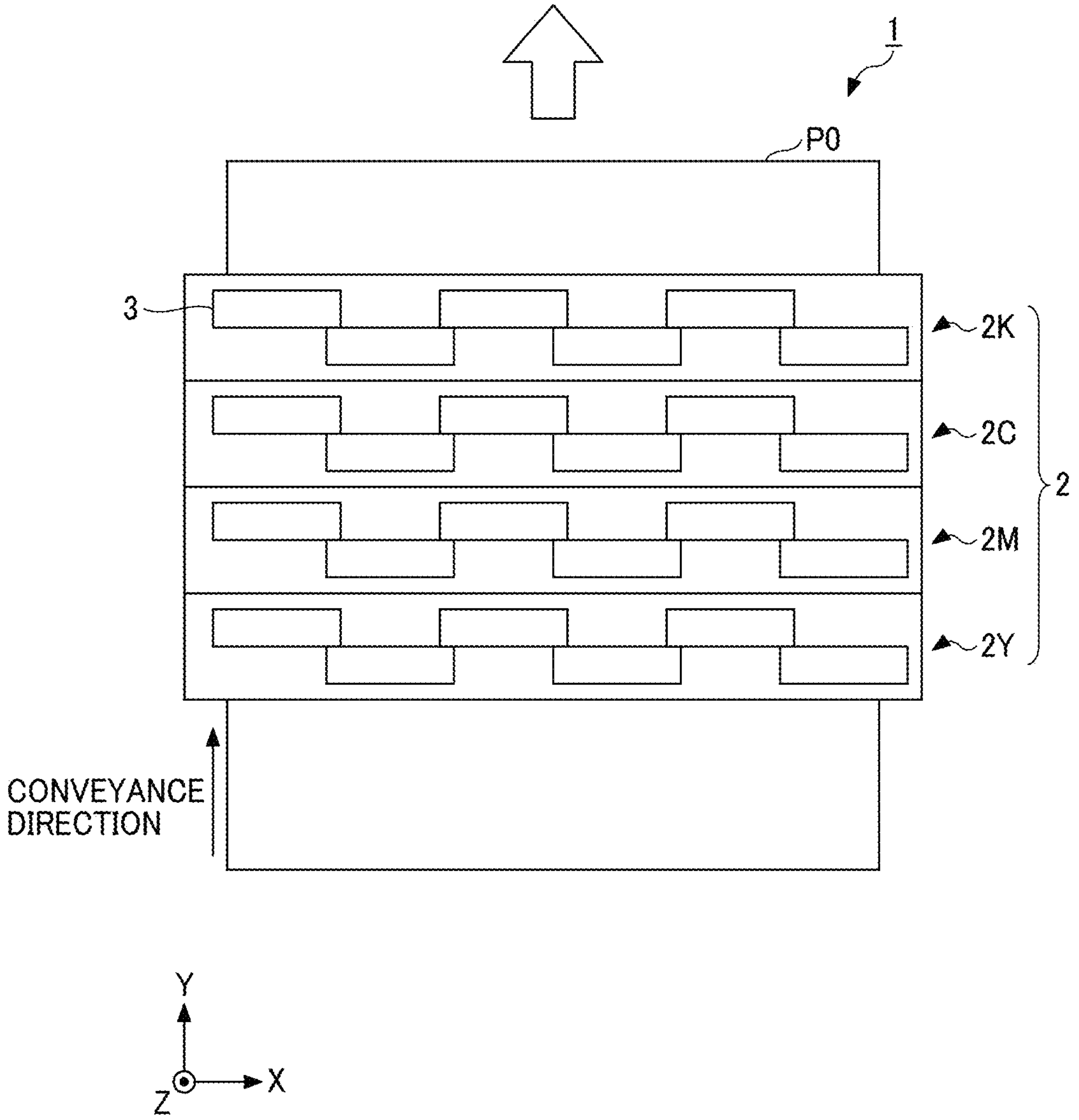
FIG. 1 is a plan view of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below.

As used herein, the singular forms "a," "an," and "the" are intended to include the plural forms as well, unless the context clearly indicates otherwise.

For the sake of simplicity, like reference signs denote like elements such as parts and materials having the same functions, and redundant descriptions thereof are omitted unless otherwise required.

In the following description, suffixes Y, M, C, and K denote colors of yellow, magenta, cyan, and black, respectively. To simplify the description, these suffixes are omitted unless necessary.

As used herein, the term "connected/coupled" includes both direct connections and connections in which there are one or more intermediate connecting elements.

A description is given below of an image forming apparatus 1 serving as a liquid discharge apparatus according to one or more embodiments of the present disclosure.

Image Forming Apparatus According to First Embodiment

The image forming apparatus 1 is called an inkjet recording apparatus or an ink discharge apparatus.

FIG. 1 is a plan view of the image forming apparatus 1 according to the first embodiment of the present disclosure.

The image forming apparatus 1 discharges ink droplets onto a recording medium P0 to form an image. The recording medium P0 is, for example, a sheet of paper. The recording medium P0 may be a rolled sheet (continuous paper) or a cut sheet. The recording medium P0 may have any shape. The recording medium P0 is not limited to a sheet of paper. The recording medium P0 may be another medium. The recording medium P0 may be any medium to which droplets discharged from the image forming apparatus 1 can adhere.

The image forming apparatus 1 conveys the recording medium P0 in the Y-axis direction. The Y-axis direction serves as a first direction. The Y-axis direction is a conveyance direction in which the recording medium P0 is conveyed. The image forming apparatus 1 includes a head unit 2. The image forming apparatus 1 supports the head unit 2, which includes a plurality of recording portions, at a predetermined interval from the recording medium P0. A clearance of a predetermined length is formed between the head unit 2 and the print side of the recording medium P0.

The head unit 2 includes a plurality of recording portions 2K, 2C, 2M, and 2Y. The recording portion 2K discharges black (K) ink. The recording portion 2C discharges cyan (C) ink.

The recording portion 2M discharges magenta (M) ink. The recording portion 2Y discharges yellow (Y) ink. The head unit 2 discharges ink droplets in synchronization with the sheet conveyance speed to form a color image on the recording medium P0. The number of recording portions included in the head unit 2 and the color of the ink are determined as desired. For example, the head unit 2 may include only the recording portion 2K that discharges black ink for monochrome recording.

Each of the recording portions 2K, 2C, 2M, and 2Y includes a plurality of recording heads 3.

Figure 2:
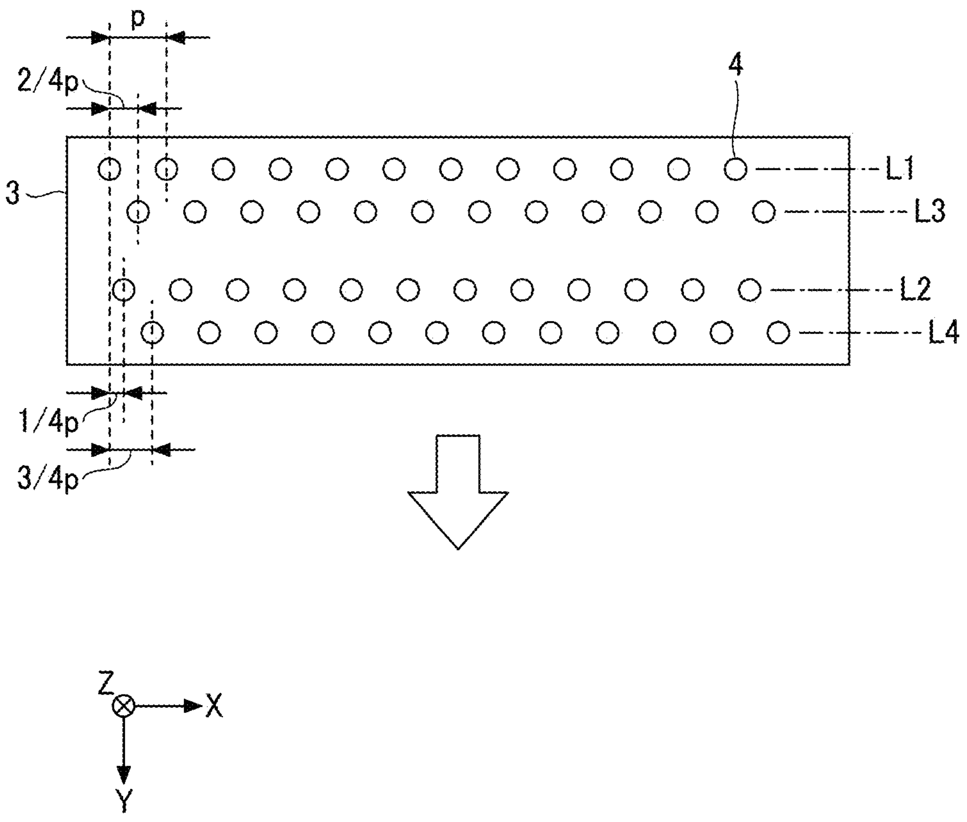
FIG. 2 is a bottom view of a face of a nozzle plate of a recording head included in the image forming apparatus of FIG. 1.

FIG. 2 is a bottom view of a face of a nozzle plate of the recording head 3 as a liquid discharge head according to the present embodiment.

The face of the nozzle plate of the recording head 3 is provided with a plurality of nozzles 4. The recording head 3 includes a plurality of nozzle arrays L1 to L4. Each of the nozzle arrays L1 to L4 includes a plurality of nozzles 4 aligned in the X-axis direction. The nozzle arrays L1 to L4 are arranged at positions different from each other in the Y-axis direction. The X-axis direction is orthogonal to the Y-axis direction. The X-axis direction serves as a second direction. The X-axis direction is a nozzle array direction in which the nozzles 4 are aligned.

In the nozzle array L1, the interval between the nozzles 4 adjacent to each other in the X-axis direction is a pitch "p". In the nozzle array L1, the nozzles 4 are arrayed at the pitch "p". In each of the nozzle arrays L2 to L4, the nozzles 4 are arrayed at the pitch "p" as in the nozzle array L1. The pitch "p" is the distance between the centers of the adjacent nozzles 4.

The nozzle arrays L1 to L4 are arranged in the order of, for example, the nozzle array L1, the nozzle array L3, the nozzle array L2, and the nozzle array L4 from upstream in the conveyance direction of the recording medium P0. The nozzle array L1 is located most upstream in the conveyance direction. The nozzle array L4 is located most downstream in the conveyance direction. The nozzle array L3 is located downstream from the nozzle array L1. The nozzle array L2 is located downstream from the nozzle array L3. The nozzle array L4 is located downstream from the nozzle array L2.

The nozzles 4 of the nozzle arrays L1 to L4 are shifted from each other in the X-axis direction.

Figure 3:
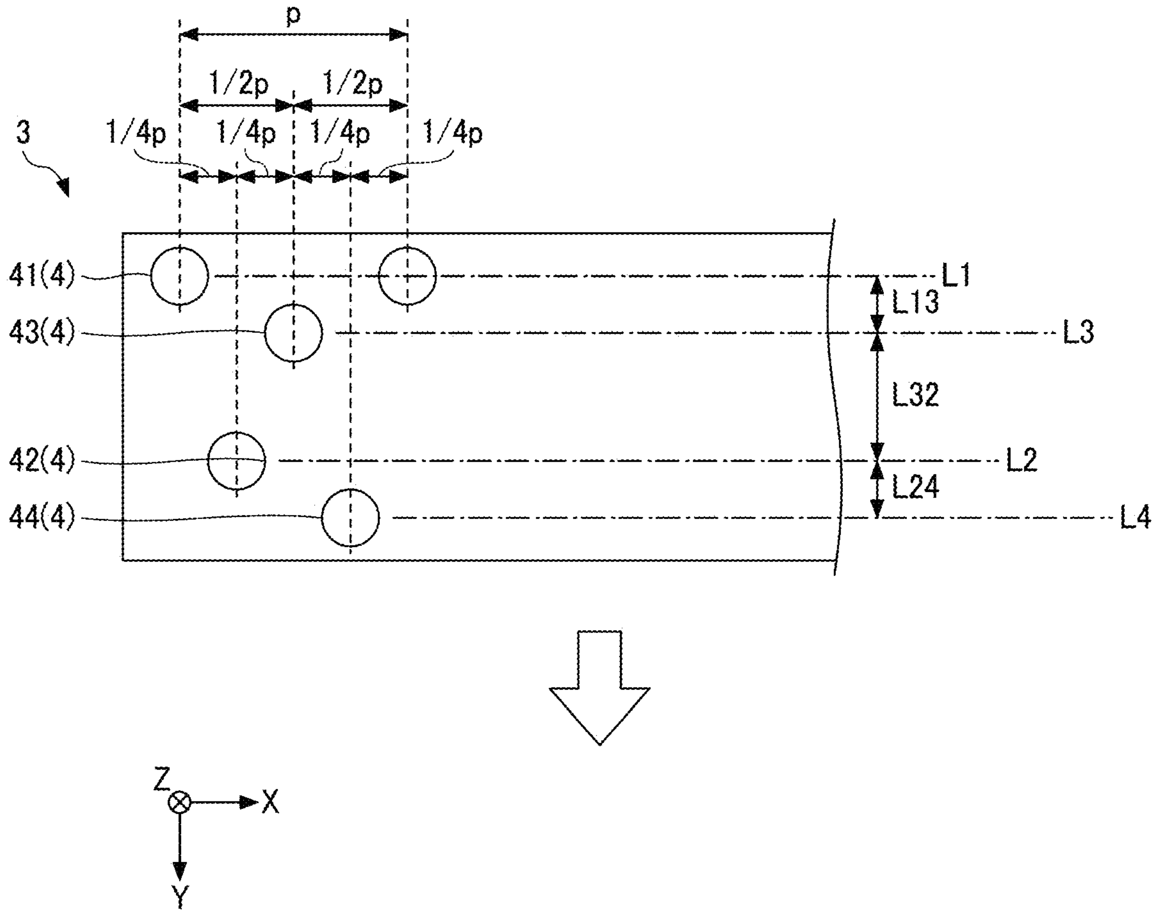
FIG. 3 is an enlarged bottom view of the face of the nozzle plate of the recording head of FIG. 2.

FIG. 3 is an enlarged bottom view of the face of the nozzle plate, illustrating the nozzles 4 at an end portion of the face in the X-axis direction.

For example, FIG. 3 illustrates the leftmost nozzles 4 (41 to 44) in the X-axis direction.

The nozzle 41 is the leftmost nozzle among the nozzles 4 included in the nozzle array L1. The nozzle 42 is the leftmost nozzle among the nozzles 4 included in the nozzle array L2. The nozzle 43 is the leftmost nozzle among the nozzles 4 included in the nozzle array L3. The nozzle 44 is the leftmost nozzle among the nozzles 4 included in the nozzle array L4.

The nozzles 41, 42, 43, and 44 are arranged in this order from the left in the X-axis direction in FIG. 3. Specifically, in the X-axis direction in FIG. 3, the nozzle 41 of the nozzle array L1 is arranged at the leftmost position, the nozzle 42 of the nozzle array L2 is arranged at the second position from the left, the nozzle 43 of the nozzle array L3 is arranged at the third position from the left, and the nozzle 44 of the nozzle array L4 is arranged at the fourth position from the left.

In the X-axis direction, the interval between the nozzle 41 of the nozzle array L1 and the nozzle 42 of the nozzle array L2 is a quarter pitch. In the X-axis direction, the interval between the nozzle 42 of the nozzle array L2 and the nozzle 43 of the nozzle array L3 is a quarter pitch. In the X-axis direction, the interval between the nozzle 43 of the nozzle array L3 and the nozzle 44 of the nozzle array L4 is a quarter pitch. In the X-axis direction, the interval between the nozzle 44 of the nozzle array L4 and the nozzle 41 of the nozzle array L1 to the right of the nozzle 44 is a quarter pitch.

Hardware Configuration and Functional Configuration of Image Forming Apparatus 1

Figure 4:
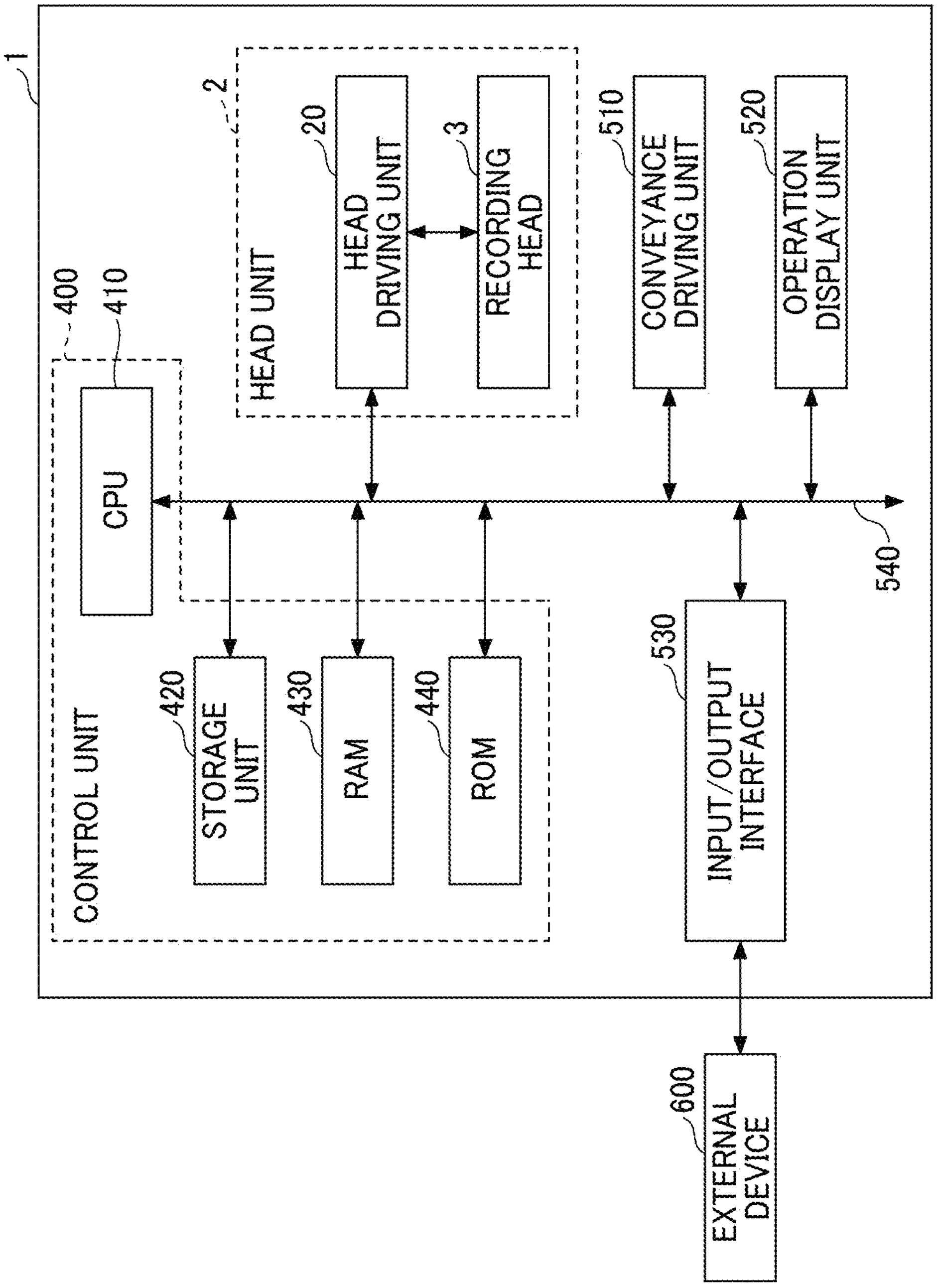
FIG. 4 is a block diagram illustrating a hardware configuration and a functional configuration of the image forming apparatus according to the first embodiment of the present disclosure.

Referring to FIG. 4, a description is given below of a hardware configuration and a functional configuration of the image forming apparatus 1 according to the present embodiment.

FIG. 4 is a block diagram illustrating a hardware configuration and a functional configuration of the image forming apparatus according to the first embodiment of the present disclosure.

The image forming apparatus 1 includes a control unit 400, a conveyance driving unit 510, an operation display unit 520, an input/output interface 530, and a bus 540.

The control unit 400 includes a central processing unit (CPU) 410, a random-access memory (RAM) 430, and a read-only memory (ROM) 440. The control unit 400 may include a nonvolatile random-access memory (NVRAM).

The CPU 410 is a calculation unit and controls the operation of the entire image forming apparatus 1. The CPU 410 performs control related to the operation to convey the recording medium P0 and the operation to move the recording head 3. The ROM 440 is a read-only non-volatile storage medium. The ROM 440 stores programs such as firmware. The RAM 430 is a volatile storage medium capable of reading and writing information at high speed. The RAM 430 is used as a work area for the CPU 410 to process information.

The CPU 410 reads a program from the ROM 440 and loads the program into the RAM 430. The CPU 410 executes calculations according to the program loaded into the RAM 430, thus functioning as a software control unit. The NVRAM may store programs. The other storage media may store programs.

The software control unit cooperates with hardware to implement functions, illustrated as functional blocks, of the image forming apparatus 1.

The CPU 410 reads various control programs and settings from the ROM 440, stores them in the RAM 430, and executes the programs to perform various arithmetic processing. The CPU 410 controls the overall operation of the image forming apparatus 1.

An external device 600 is connected to the input/output interface 530 of the image forming apparatus 1. The external device 600 is, for example, a personal computer. The external device 600 outputs a print job (image recording instruction) and image data related to the print job. The external device 600 outputs image data of a test image (a chart for detecting the variation in dot size and dot skew), which will be described later.

The input/output interface 530 mediates the transmission and reception of data between the external device 600 and the control unit 400. The image forming apparatus 1 receives data output from the external device 600 through the input/output interface 530. The ROM 440 stores various kinds of data input from the external device 600.

The bus 540 is a path for transmitting and receiving signals between the control unit 400 and other components. The CPU 410, a storage unit 420, the RAM 430, the ROM 440, a head driving unit 20, the conveyance driving unit 510, the operation display unit 520, and the input/output interface 530 are connected to the bus 540.

The control unit 400 supplies a control signal to the conveyance driving unit 510. The conveyance driving unit 510 supplies a driving signal to a conveyance motor based on the control signal supplied from the control unit 400. The conveyance driving unit 510 supplies the drive signal to the conveyance motor to convey the recording medium P0 at a predetermined speed and a predetermined time.

The operation display unit 520 includes a display device and an input device. The display device may be, for example, a liquid-crystal display or an organic electroluminescent display. The input device may be an operation key or a touch panel. The display device and the input device are not limited to the aforementioned examples. The operation display unit 520 can display various kinds of information on the display device. The operation display unit 520 converts an input operation performed by the user on the input device into an operation signal and outputs the operation signal to the control unit 400.

Arrangement of Nozzles of Recording Head

A description is given below of the arrangement of the nozzles 4 of the recording head 3. As illustrated in FIG. 3, the nozzle arrays L1 to L4 are separated from each other in the Y-axis direction. A distance L13 between the nozzle array L1 and the nozzle array L3 in the Y-axis direction is, for example, 1.0 mm. A distance L32 between the nozzle array L3 and the nozzle array L2 in the Y-axis direction is, for example, 5.0 mm. A distance L24 between the nozzle array L2 and the nozzle array L4 in the Y-axis direction is, for example, 1.0 mm. The arrangement of the nozzle arrays L1 to L4 and the distances L13, L32, and L24 are not limited to the example illustrated in FIG. 3.

Arrangement of Dots in Solid Image

Figure 5:
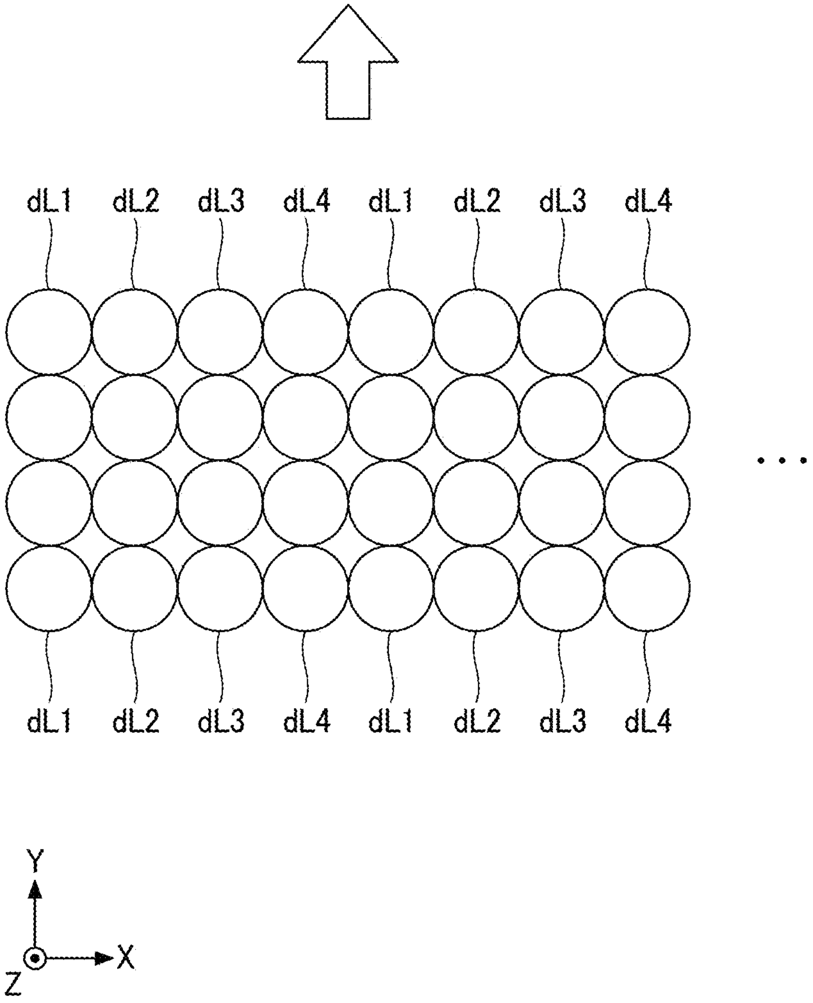
FIG. 5 is a plan view of the arrangement of dots in a solid image.
Figure 6A:
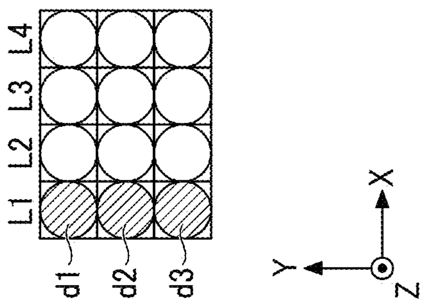
FIGS. 6A to 6D are diagrams illustrating the landing order of dots in a solid image in a case where all the dots are small droplets.
Figure 6B:
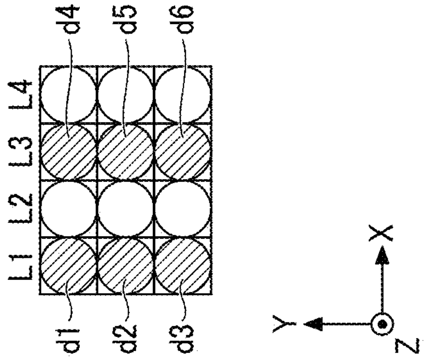
Figure 6C:
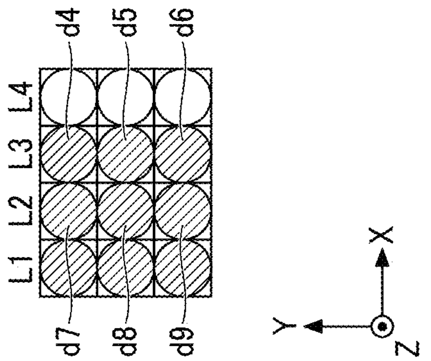
Figure 6D:
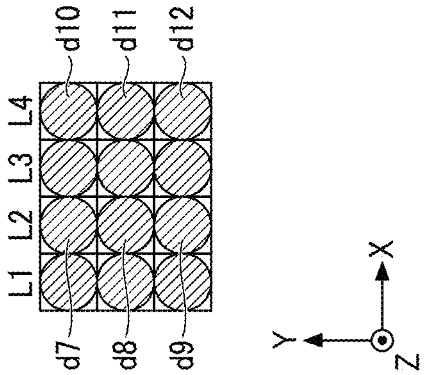

Referring to FIG. 5, a description is given below of the arrangement of dots in a solid image.

FIG. 5 is a plan view of the arrangement of dots in a solid image.

Dots dL1 to dL4 are droplets after landing on the recording medium P0. The dots dL1 are formed from the droplets discharged from the nozzle array L1. The dots dL2 are formed from the droplets discharged from the nozzle array L2. The dots dL3 are formed from the droplets discharged from the nozzle array L3. The dots dL4 are formed from the droplets discharged from the nozzle array L4.

The dots dL1, dL2, dL3, and dL4 are arranged from the left in the X-axis direction in the solid image. The droplets are discharged and land from the nozzle array L1, the nozzle array L3, the nozzle array L2, and the nozzle array L4 in this order to form the solid image.

The nozzle array L1 is the nozzle array from which the droplets land the earliest among the nozzle arrays L1 to L4. The nozzle array L4 is the nozzle array from which the droplets land the latest among the nozzle arrays L1 to L4. The nozzle array L3 is the nozzle array from which the droplets land the second earliest among the nozzle arrays L1 to L4. The nozzle array L2 is the nozzle array from which the droplets land the third earliest among the nozzle arrays L1 to L4. Among the nozzle arrays L1 to L3, the nozzle array L1 is a nozzle array from which the droplets land the earliest whereas the nozzle array L2 is a nozzle array from which the droplets land the latest.

Landing Order of Small Droplets

Referring to FIGS. 6A to 6D, a description is given below of the landing order of droplets.

FIGS. 6A to 6D are diagrams illustrating the landing order of dots in a solid image in a case where all the dots are small droplets.

Each of FIGS. 6A to 6D illustrates a square of twelve pixels in total: three pixels per column in the Y-axis direction, which is the conveyance direction, and four pixels per line in the X-axis direction, which is the nozzle array direction. In the present example, all the dots are small droplets. Specifically, a small droplet is discharged to form a dot on the recording medium P0. The droplet may be referred to as a dot in the following description.

The landing order of dots (droplets) follows the order of discharging the droplets. The order of discharging the droplets follows the order of arrangement of the nozzle arrays L1 to L4 (L1→L3→L2→L4) in the conveyance direction of the recording medium P0. First, the dots d1, d2, and d3 of the nozzle array L1 land. Subsequently, the dots d4, d5, and do of the nozzle array L3 land. Subsequently, the dots d7, d8, and d9 of the nozzle array L2 land. Subsequently, the dots d10, d11, and d12 of the nozzle array L4 land in this order.

Each pixel size depends on the print resolution. For example, in the case of 1200 dpi×1200 dpi, one pixel corresponds to 21 μm. In this case, since the distances L13, L32, and L24 between the nozzle arrays are about several millimeters in the nozzle layout, the difference in landing time between the nozzle arrays is on the order of several milliseconds. The difference in landing time when droplets are shot continuously from the same nozzle 4 is on the order of several microseconds.

The print resolution is not limited to 1200 dpi×1200 dpi. Alternatively, the print resolution may be 600 dpi×600 dpi, 2400 dpi×2400 dpi, or 600 dpi×1200 dpi. Since a droplet size corresponding to each print resolution is typically applied, one pixel is filled with one dot. In general, the difference in landing time between droplets discharged from the same nozzle 4 is shorter than the difference in landing time between nozzle arrays due to the distance between the nozzle arrays. Given the difficulty in adjusting the landing timing of the droplets, no recording head 3 is present in which the distances L13, L32, and L24 between the nozzle arrays are extremely large enough to reverse the above-described relationship.

Although each of FIGS. 6A to 6D illustrates the small droplets in a dot size inscribed in each pixel, the size of the dots d1 to d12 is not limited thereto. The size of the dots d1 to d12 may be larger or smaller than the size illustrated in each of FIGS. 6A to 6D. In the following description, the small droplets are illustrated in a size inscribed in each pixel whereas the large droplets are illustrated in a size circumscribing each pixel. A large droplet is a droplet that is greater in volume than a small droplet. The large droplet is, for example, a combination of three small droplets.

Landing Order of Small and Large Droplets in First Case

A description is given below of the landing order of droplets formed by an image forming apparatus according to a comparative example.

Referring to FIGS. 7A to 7D, a description is given below of a case where small and large droplets coexist and dots are absent on either side of the landing position of a large droplet in the X-axis direction before the large droplet lands.

FIGS. 7A to 7D illustrate a case where a solid image is formed by discharging eleven small droplets and one large droplet.

In the case illustrated in FIGS. 7A to 7D, the landing order of the droplets is substantially the same as that in the example illustrated in FIGS. 6A to 6D. First, the dots d1, d2, and d3 of the nozzle array L1 land. Subsequently, the dots d4, d5, and d6 of the nozzle array L3 land. Subsequently, the dots d7, d8, and d9 of the nozzle array L2 land. Subsequently, the dots d10, d11, and d12 of the nozzle array L4 land in this order.

Figure 7A:
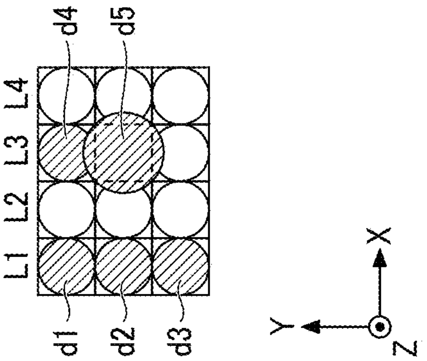
FIG. 7A RELATED ART
FIGS. 7A to 7D are diagrams illustrating the landing order of dots in a solid image in a case where no dot is present around a large droplet discharged.

As illustrated in FIG. 7A, the dots d1 to d4 are small droplets. The dot d5 is a large droplet. The time difference between the dot d5 and the dot d4 preceding the dot d5 is several microseconds.

Figure 7B:
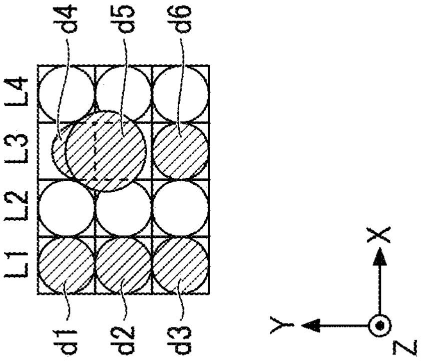
FIG. 7B RELATED ART

In the present example, as illustrated in FIG. 7B, the overlapping dots d5 and d4 move and attract each other due to coalescence. In other words, the droplets (dots) that have landed on the recording medium attract each other and move to coalesce (unite into a whole). The coalescence is an example of interference of droplets.

Immediately thereafter, the dot d6 as a small droplet is discharged with a time difference of several microseconds. At this time, the dot d5 moves toward the dot d4 and away from the dot d6. For this reason, the dot d5 and the dot d6 are unlikely to coalesce.

Figure 7C:
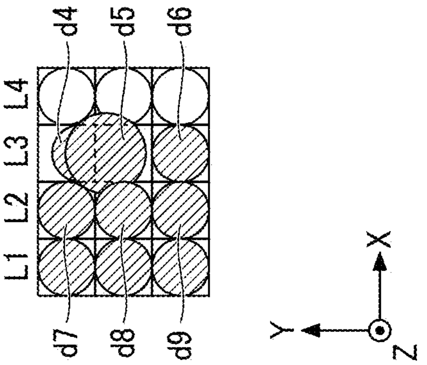
FIG. 7C RELATED ART
Figure 7D:
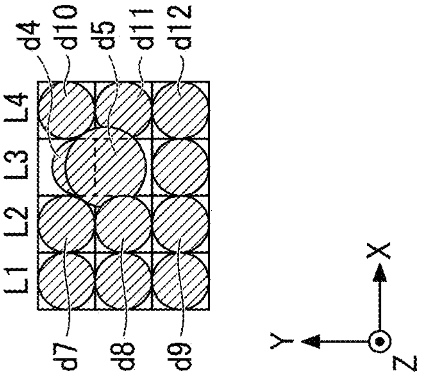
FIG. 7D RELATED ART

Thereafter, as illustrated in FIG. 7C, the dots d7 to d9 land from the nozzle array L2 and the dots d10 to d12 land from the nozzle array L4 with a time difference of several milliseconds. At this time, the dots d7 to d12 on both sides of the dot d5 in the X-axis direction overlap the dot d5. However, the movement of the dots due to the coalescence is relatively small because of the time difference in landing between the dot d5 and the dots d7 to d12. In the present example, as illustrated in FIG. 7D, the image in which all the dots d1 to d12 have landed includes gaps around the dots d4 and d5. For example, the image has areas to which no ink adheres on both sides of the dots d4 and d5 in the Y-axis direction. When the image forming apparatus according to the comparative example forms an image, the dot d5 as a large droplet and the d4 as a small droplet adjacent to the dot d5 coalesce. Thus, the droplets move. For this reason, the image includes an area to which no ink adheres.

Landing Order of Small and Large Droplets in Second Case

Referring to FIGS. 8A to 8D, a description is given below of a case where small and large droplets coexist and dots d2 and d5 are present on both sides of the landing position of a large droplet in the X-axis direction before the large droplet lands.

FIGS. 8A to 8D illustrate a case where one large droplet is discharged from the nozzle 4 of the nozzle array L2.

The landing timing of the droplets follows the discharging timing of the liquid as described above. As described above, the liquid is discharged from the nozzle array L1, the nozzle array L3, the nozzle array L2, and the nozzle array L4 in this order.

Figures 8A, 8B, 8C, 8D:
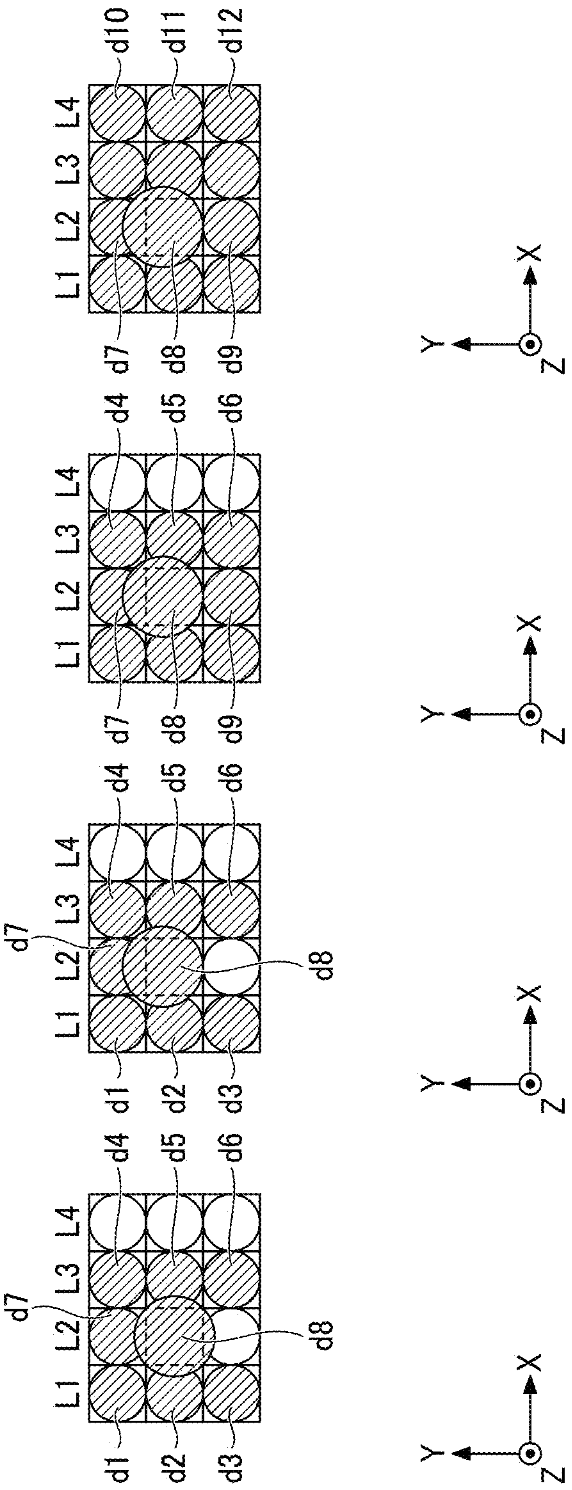
FIGS. 8A to 8D are diagrams illustrating the landing order of dots in a solid image in a case where dots are present around a large droplet discharged.

As illustrated in FIG. 8A, the dots d1 to d7 are small droplets. The dot d8 is a large droplet. The time difference between the dot d8 and the dot d7 preceding the dot d8 is several microseconds. In the present example, as illustrated in FIG. 8B, the dot d8 overlap the dot d7. At this time, the dot d8 also overlaps the dots d2 and d5 adjacent to the dot d8 in the X-axis direction. The dot d8 is likely to move toward the dot d7 having the shortest landing time difference from dot d8 while overlapping the dots d2 and d5. In this case, the amount of movement of the dot d8 is smaller than the amount of movement of the dot d5 illustrated in FIG. 7B.

After the dot d8 lands, the dot d9 lands as illustrated in FIG. 8C. Subsequently, the dots d10 to d12 discharged from the nozzle array L4 sequentially land as illustrated in FIG. 8D. The image in which all the dots d1 to d12 have landed includes no gap or a slight gap around the dot d8, despite some movement around the dot d8.

As described above, the amount of movement of dots varies depending on the situation of the surrounding dots in configurations of the same amount of droplets (eleven small droplets and one large droplet). Compared to a case where the nozzle array L3 is used to discharge the large droplet before the adjacent droplets as illustrated in FIG. 7B, the movement of the dots is small in the present example and thus reduces the deterioration of the image quality due to the coalescence.

When a similar solid image is formed only with the small droplets varying in dot size between the nozzles 4, a larger droplet lands from the nozzle 4 preferably after a smaller droplet lands from the nozzle 4 as described above.

Control Unit 400

A description is given below of the control unit 400 illustrated in FIG. 4.

The control unit 400 controls a discharge operation to discharge the droplets from the nozzle arrays L1 to L4. The control unit 400 can control the discharge operation so that the droplets land on the recording medium P0 at different times. The control unit 400 controls the discharge operation to change the amount of droplets to be discharged. The control unit 400 transmits a control signal to the head driving unit 20 to drive a piezoelectric element and control the discharge operation.

The control unit 400 causes the nozzle array L1 to discharge a droplet of a first reference amount. The droplets land the earliest from the nozzle array L1 among the nozzle arrays L1 to L4 (L1→L3→L2→L4). The nozzle array L1 in this case serves as a first nozzle array. The control unit 400 causes the nozzle array L4 to discharge a large droplet of a second reference amount greater than the first reference amount. The droplets land the latest from the nozzle array L4 among the nozzle arrays L1 to L4. The nozzle array L4 in this case serves as a second nozzle array. The droplet of the first reference amount may be, for example, a small droplet. The control unit 400 may cause the nozzle array L2 to discharge the large droplet of the second reference amount greater than the first reference amount. The droplets land the latest from the nozzle array L2 among the nozzle arrays L1 to L3 (L1→L3→L2).

The control unit 400 may cause the nozzle arrays L1 to L4 to discharge a medium droplet of a third reference amount. The third reference amount is greater than the first reference amount and smaller than the second reference amount. The medium droplet is greater in volume than a small droplet and smaller in volume than a large droplet. The medium droplet is, for example, a combination of two small droplets.

When a small droplet lands on one of a first position and a second position adjacent to each other in the Y-axis direction as the first direction on the recording medium P0 and a medium or large droplet lands on the other one of the first position and the second position, the control unit 400 can control the discharge operation to discharge the small droplet before discharging the medium or large droplet.

For example, when a small droplet lands on the position of one of the dot d7 and the dot d8 and a medium or large droplet lands on the position of the other one of the dot d7 and the dot d8 as illustrated in FIG. 8B, the control unit 400 discharges the small droplet onto the position of the dot d7 before discharging the medium or large droplet onto the position of the dot d8.

The control unit 400 can control the discharge operation to cause the nozzle array L2 to discharge the large droplet. The droplets land the latest from the nozzle array L2 among the nozzle arrays L1 to L3 (L1→L3→L2). The control unit 400 can control the discharge operation to cause the nozzle arrays L1 and L3 to discharge the small droplets. As described above, the droplets land from the nozzle arrays L1 and L3 earlier than from the nozzle array L2 among the nozzle arrays L1 to L3.

The control unit 400 can control the discharge operation to cause the nozzle array L2 to discharge the large droplet after discharging the small droplets from the nozzle arrays L1 and L3. As described above, the droplets land from the nozzle arrays L1 and L3 earlier than from the nozzle array L2 among the nozzle arrays L1 and L3.

The control unit 400 can control the discharge operation to cause the nozzle array L4 to discharge the large droplet. The droplets land the latest from the nozzle array L4 among the nozzle arrays L1 to L4. The control unit 400 controls the discharge operation to cause the nozzle arrays L1 to L3 to discharge the small droplets. The droplets land earlier from the nozzle arrays L1 to L3 than from the nozzle array L4 among the nozzle arrays L1 to L4.

The control unit 400 can control the discharge operation to cause the nozzle array L4 to discharge the large droplet after causing the nozzle arrays L1, L3, and L2 to discharge the small droplets. As described above, the droplets land from the nozzle arrays L1, L3, L2, and L4 in this order. In other words, the droplets land from the nozzle arrays L1, L3, and L2 earlier than from the nozzle array L4 among the nozzle arrays L1 to L4.

Operational Advantages of Image Forming Apparatus According to First Embodiment

In the image forming apparatus 1 according to the first embodiment, the control unit 400 controls the discharge operation to cause the nozzle array L1 to discharge the small droplet of the first reference amount and cause the nozzle array L4 to discharge the large droplet of the second reference amount greater than the first reference amount. Droplets land the earliest from the nozzle array L1 among the nozzle arrays L1 to L4, whereas droplets land the latest from the nozzle array L4 among the nozzle arrays L1 to L4.

By discharging the large droplet later so that the large droplet lands after the small droplet, the image forming apparatus 1 having the aforementioned configuration reduces the coalescence of the droplets after landing. The small droplet landing earlier than the large droplet is dried and the movement of the small droplet is restrained. As a result, the image quality is enhanced. The image forming apparatus 1 uses the nozzle array L4, from which droplets land the latest among the nozzle arrays L1 to L4, as a nozzle array that discharges large droplets, without increasing the amount of droplets to be discharged. Thus, the image forming apparatus 1 restrains the movement of dots due to the interference of droplets after landing. An increased size of droplets may be dried insufficiently as in typical image forming apparatuses. By contrast, the image forming apparatus 1 according to the present embodiment restrains the movement of dots without increasing the size of droplets. Thus, the image forming apparatus 1 prevents insufficient drying of droplets and enhances the image quality.

Relationship Between Lightness and Granularity

Figure 9:
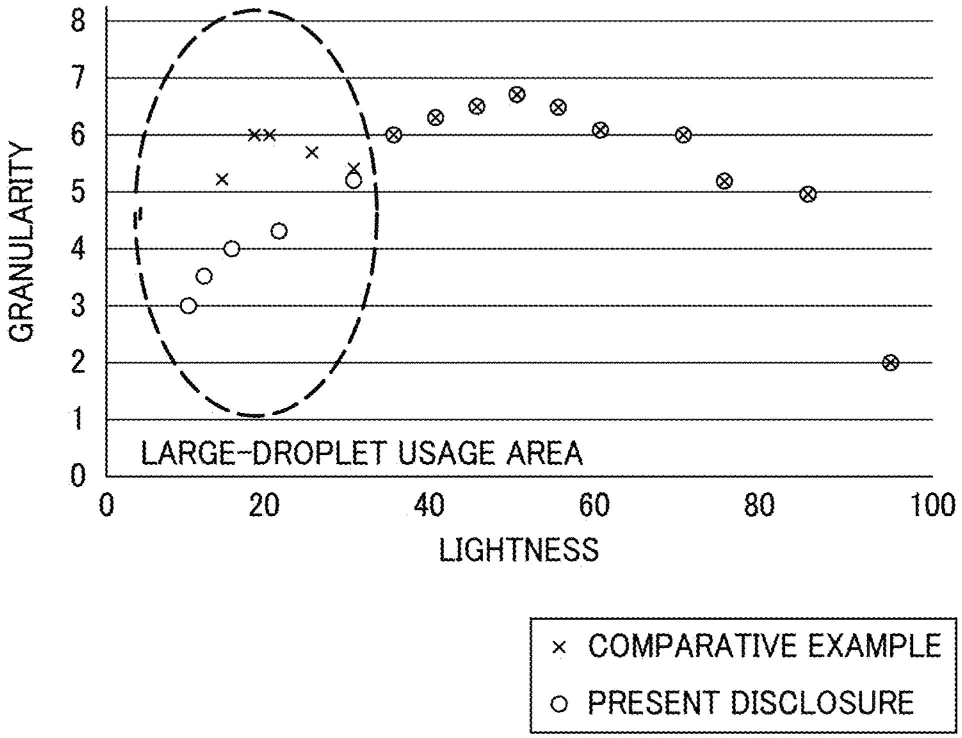
FIG. 9 is a graph illustrating a relationship between lightness and granularity according to an embodiment of the present disclosure.

Referring to FIG. 9, a description is given below of the effects of graininess and concentration reproducibility due to the improvement in dot filling.

The improvement in dot filling includes few gaps between adjacent dots.

FIG. 9 is a graph illustrating the relationship between lightness and granularity.

In FIG. 9, the horizontal axis represents the lightness, whereas the vertical axis represents the granularity.

The image forming apparatus 1 expresses gradations by gradually increasing the number of dots to be discharged from light (paper white) to dark (high concentration) under normal operating conditions. When expressing a high concentration portion, generally, a droplet type having a relatively large dot size such as a medium droplet or a large droplet is used from a certain tone in a grayscale because of the difficulty in obtaining a sufficient concentration with small droplets alone, in other words, the difficulty in darkening as lightness with small droplets alone. At this time, as illustrated in FIGS. 7A to 7D and 8A to 8D, the filling manner varies even with the same amount of droplets discharged, depending on the nozzle array for discharging large droplets.

As a result, the image forming apparatus 1 enhances the filling state of dots in a large-droplet usage area where large droplets land, compared to an image forming apparatus according to a comparative example in which the nozzle array when discharging the large droplets is not considered. FIG. 9 illustrates a clear difference in the granularity and the lightness (concentration obtained) even with the same amount of droplets discharged.

The horizontal axis of FIG. 9 indicates the lightness at a certain tone. A higher value indicates that a darker color is obtained. The vertical axis indicates the granularity. A lower value of the granularity indicates a smoother image. A smoother image causes a less roughish or grainy feel.

In the comparative example, the second peak exists as the granularity in the large-droplet usage area and the degradation of image quality is visible. In the comparative example, an increased amount of large droplets is to be discharged to obtain sufficient concentration. In this case, an increased amount of ink is consumed.

In the image forming apparatus 1, when the recording medium P0 is efficiently filled with dots, the second peak of the granularity does not appear. Thus, the concentration efficiency is enhanced. When a typical terminal concentration is a target value, the target value can be achieved even with a decreased amount of dots discharged by several tones (two tones in the example of FIG. 9). Accordingly, the ink consumption can be reduced, and at the same time, the energy consumption for drying can be reduced. For the same reason, the present embodiment can contribute to a further increase in the linear velocity of the image forming apparatus 1 having a line head.

Image Forming Apparatus According to Second Embodiment

A description is given below of the image forming apparatus 1 according to a second embodiment of the present disclosure.

Figure 10:
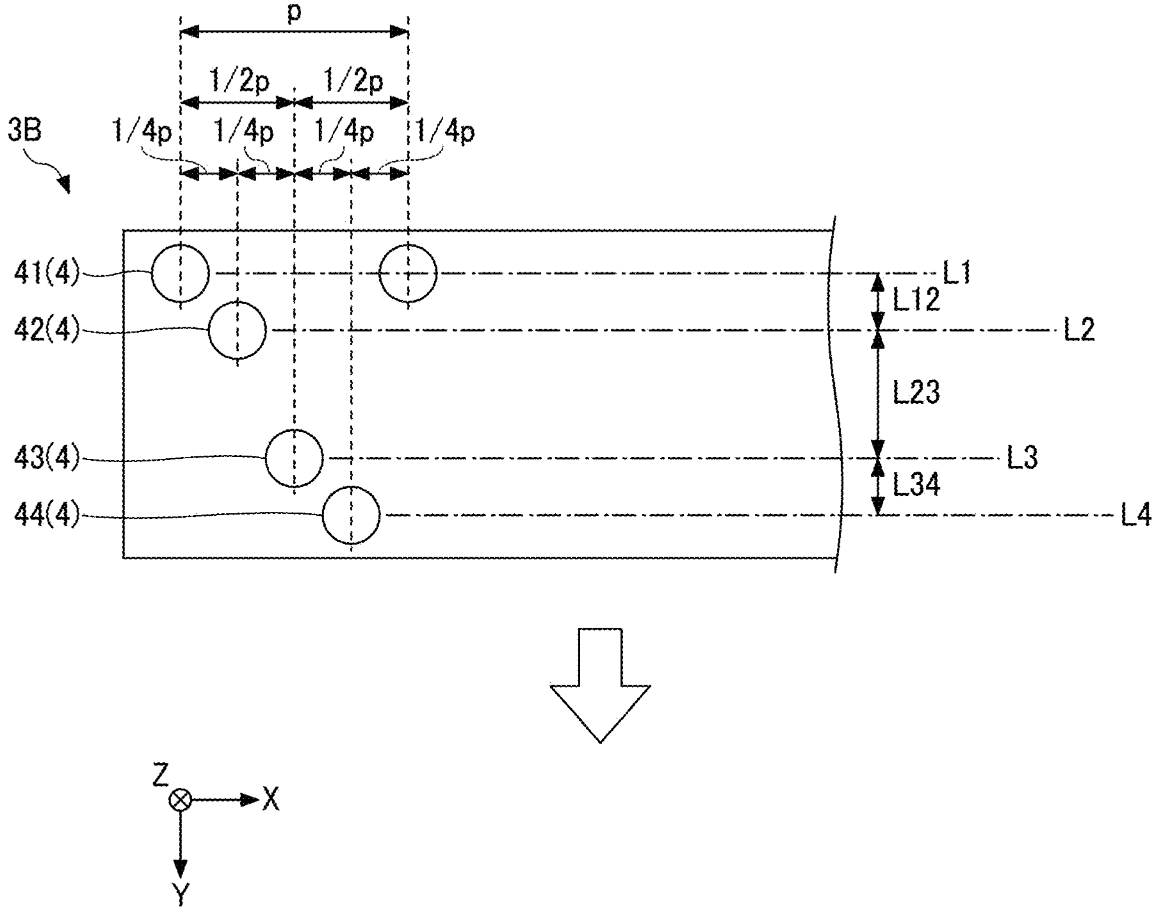
FIG. 10 is an enlarged bottom view of a face of a nozzle plate of a recording head of an image forming apparatus according to a second embodiment of the present disclosure.

FIG. 10 is an enlarged bottom view of a face of a nozzle plate of a recording head of the image forming apparatus 1 according to the second embodiment of the present disclosure.

The image forming apparatus 1 according to the second embodiment is different from the image forming apparatus 1 according to the first embodiment in that the image forming apparatus 1 according to the second embodiment includes a recording head 3B instead of the recording head 3. In the recording head 3B, the nozzle arrays L1 to L4 are arranged differently from the nozzle arrays L1 to L4 in the recording head 3. Redundant descriptions between the first embodiment and the second embodiment will be omitted below.

As illustrated in FIG. 10, the recording head 3B includes the nozzle arrays L1 to L4. The nozzle arrays L1, L2, L3, and L4 are arranged in this order from upstream in the conveyance direction of the recording medium P0.

The nozzle 41 of the nozzle array L1, the nozzle 42 of the nozzle array L2, the nozzle 43 of the nozzle array L3, and the nozzle 44 of the nozzle array L4 are arranged in this order from the left in the X-axis direction in FIG. 10.

A distance L12 between the nozzle array L1 and the nozzle array L2 in the Y-axis direction is, for example, 1.0 mm. A distance L23 between the nozzle array L2 and the nozzle array L3 in the Y-axis direction is, for example, 5.0 mm. A distance L34 between the nozzle array L3 and the nozzle array L4 in the Y-axis direction is, for example, 1.0 mm. The arrangement of the nozzle arrays L1 to L4 and the distances L12, L23, and L34 are not limited to the example illustrated in FIG. 10.

Order of Discharging Droplets

When the nozzle arrays L1 to L4 (L1→L2→L3→L4) are used to discharge large droplets in the image forming apparatus 1, the large droplets are discharged first from the nozzle array LA, from which the droplets land the latest among the nozzle arrays L1 to L4. When discharging large droplets, the nozzle array L4 has the highest priority, the nozzle array L3 has the second highest priority, the nozzle array L2 has the third highest priority, and the nozzle array L1 has the lowest priority.

For example, when large droplets are discharged from the nozzle array L4 and also from the nozzle array L3, the large droplets are adjacent to each other in the image. In this case, the image has a portion exhibiting a locally higher concentration than the other portion. Such a portion is likely to be visually recognized as banding such as a black stripe.

When a plurality of nozzle arrays including the nozzle array L4 is used to discharge large droplets among the nozzle arrays L1 to L4 in the image forming apparatus 1 according to the second embodiment, the nozzle 42 of the nozzle array L2 is used together with the nozzle 44 of the nozzle array L4. The nozzle 43 of the nozzle array L3 or the nozzle 41 of the nozzle array L1 each adjacent to the nozzle 44 of the nozzle array L4 is not used.

When the nozzle arrays L1 to L3 (L1→L2→L3) are used to discharge large droplets in the image forming apparatus 1, the large droplets are discharged first from the nozzle array L3, from which droplets land the latest among the nozzle arrays L1 to L3. When discharging large droplets, the nozzle array L3 has the highest priority, the nozzle array L2 has the second highest priority, and the nozzle array L1 has the lowest priority.

When a plurality of nozzle arrays including the nozzle array L3 is used to discharge large droplets among the nozzle array L1 to L3 in the image forming apparatus 1 according to the second embodiment, the nozzle 41 of the nozzle array L1 is used together with the nozzle 43 of the nozzle array L3. The nozzle 42 of the nozzle array L2 adjacent to the nozzle 43 of the nozzle array L3 is not used.

When large droplets are discharged from a plurality of nozzle arrays in a case where the recording head 3 has five or more nozzle arrays, large droplets are preferably discharged from a nozzle array from which droplets land the latest among the nozzle arrays that are not adjacent to each other.

Operational Advantages of Image Forming Apparatus According to Second Embodiment The image forming apparatus 1 according to the second embodiment achieves operational advantages like the operational advantages achieved by the image forming apparatus 1 according to the first embodiment.

Image Forming Apparatus According to Third Embodiment

A description is given below of the image forming apparatus 1 according to a third embodiment of the present disclosure.

The image forming apparatus 1 according to the third embodiment is different from the image forming apparatus 1 according to the first embodiment in that the order of discharging droplets is determined in consideration of the degree of skew of the droplets discharged from the nozzle arrays L1 to L4. Redundant descriptions between the third embodiment and the embodiments described above will be omitted below.

Landing Order of Droplets Skewing After Being Discharged in First Case

Referring to FIGS. 11A to 11D, a description is given below of a case where droplets skew after being discharged.

FIGS. 11A to 11D are diagrams illustrating the landing order of dots in a solid image in a first case where droplets skew after being discharged, according to the third embodiment of the present disclosure.

Each of FIGS. 11A to 11D illustrates a square of twelve pixels in total: three pixels per column in the Y-axis direction, which is the conveyance direction, and four pixels per line in the X-axis direction, which is the nozzle array direction. In the present example, all the dots are small droplets.

Like the first embodiment, the droplets land from the nozzle array L1, the nozzle array L3, the nozzle array L2, and the nozzle array L4 in this order. The droplets are discharged from the nozzle array L1, which is located most upstream in the conveyance direction, the nozzle array L3, the nozzle array L2, and the nozzle array L4 in this order. The landing order of droplets is the same as the order of discharging droplets.

In the case illustrated in FIGS. 11A to 11D, the droplets discharged from the nozzle array L3 skew. The dots d4 to d6, which are droplets discharged from the nozzle array L3, land while skewing, for example, leftwards in FIGS. 11A to 11D.

Thereafter, the dots d7 to d9 land. At this time, the dot d7 overlaps the dot d4 adjacent to the dot d7 in the X-axis direction, resulting in the coalescence of the dots d4 and d7. Similarly, the dot d8 overlaps the dot d5 adjacent to the dot d8 in the X-axis direction, resulting in the coalescence of the dots d5 and d8. The dot d9 overlaps the dot d6 adjacent to the dot d9 in the X-axis direction, resulting in the coalescence of the dots d6 and d9.

Figure 11A:
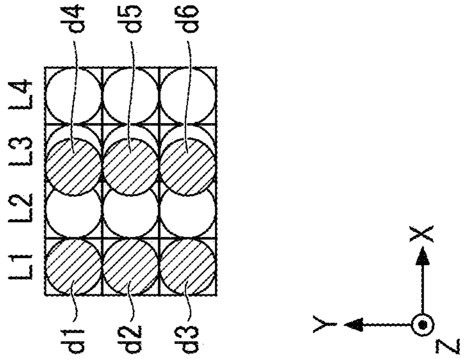
FIGS. 11A to 11D are diagrams illustrating the landing order of dots in a solid image in a first case where droplets skew after being discharged, according to a third embodiment of the present disclosure.
Figure 11B:
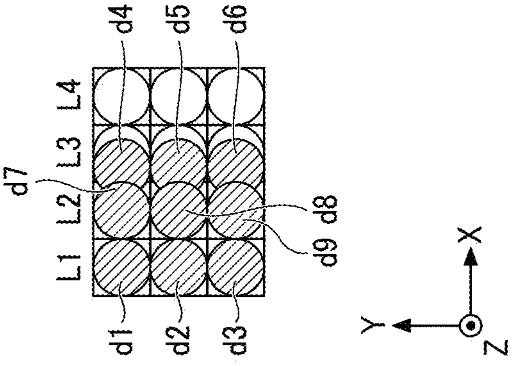
Figure 11C:
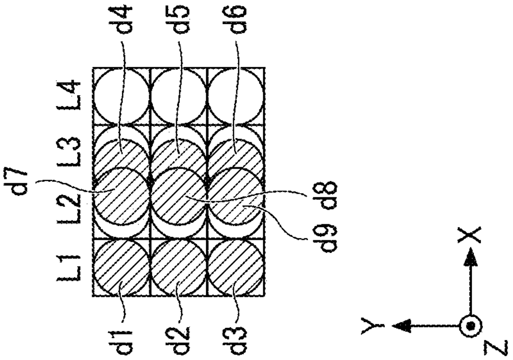
Figure 11D:
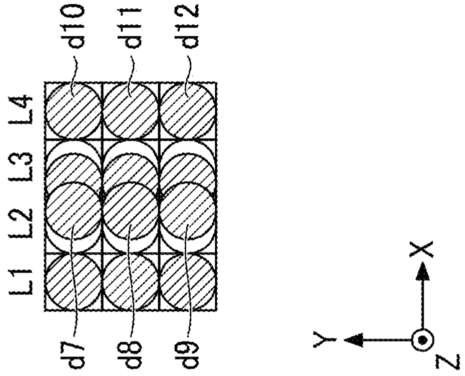

At this time, the dots d4 to d6, which have landed before the dots d7 to d9, slightly move, whereas the dots d7 to d9 are attracted to the dots d4 to d6. As illustrated in FIG. 11D, when all of the dots d1 to d12 land, gaps are likely to be formed at both sides in the X-axis direction of each of the overlapping dots d4 and d7, the overlapping dots d5 and d8, and the overlapping dots d6 and d9. Such gaps may be recognized as streaks.

Landing Order of Droplets Skewing After Being Discharged in Second Case

Referring to FIGS. 12A to 12D, a description is given below of a case where droplets skew after being discharged.

FIGS. 12A to 12D are diagrams illustrating the landing order of dots in a solid image in a second case where droplets skew after being discharged, according to the third embodiment of the present disclosure.

The landing timing of the droplets is substantially the same as that in the first embodiment.

In the case illustrated in FIGS. 12A to 12D, the droplets discharged from the nozzle array L2 skew. The dots d7 to d9, which are droplets discharged from the nozzle array L2, land while skewing, for example, rightwards in FIGS. 12A to 12D. Dots d1 to do have already landed at both sides in the X-axis direction of the landing position of the skewing droplets.

At this time, the dot d7 overlaps the dot d4 adjacent to the dot d7 in the X-axis direction, resulting in the coalescence of the dots d4 and d7. Similarly, the dot d8 overlaps the dot d5 adjacent to the dot d8 in the X-axis direction, resulting in the coalescence of the dots d5 and d8. The dot d9 overlaps the dot d6 adjacent to the dot d9 in the X-axis direction, resulting in the coalescence of the dots d6 and d9. The dots d4 to d6, which have landed before the dots d7 to d9, slightly move, whereas the dots d7 to d9 are attracted to the dots d4 to d6 and move rightwards in FIGS. 12A to 12D.

Figure 12A:
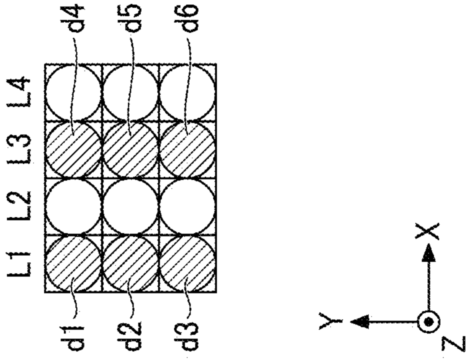
FIGS. 12A to 12D are diagrams illustrating the landing order of dots in a solid image in a second case where droplets skew after being discharged, according to the third embodiment of the present disclosure.
Figure 12B:
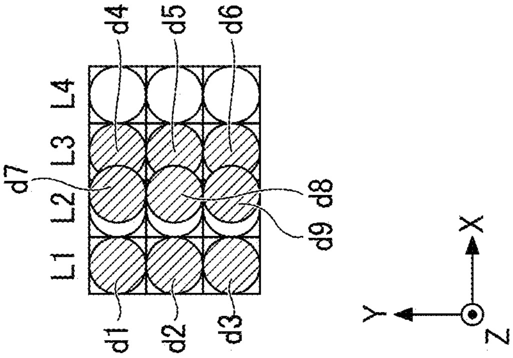
Figure 12C:
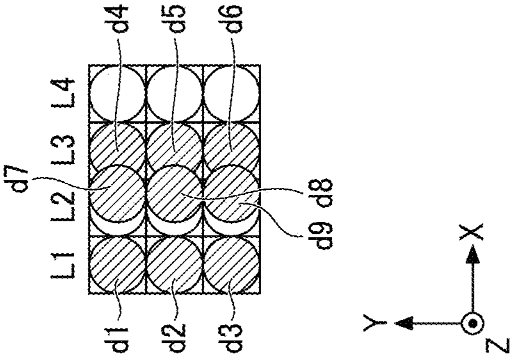
Figure 12D:
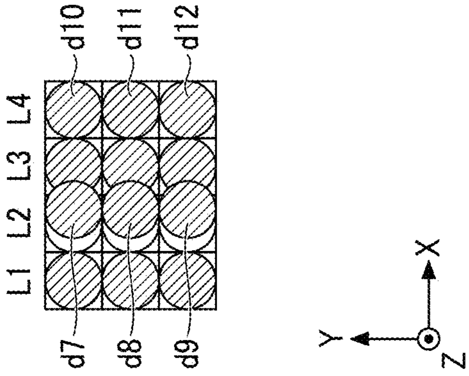

As illustrated in FIG. 12D, when all the dots d1 to d12 land, a slight gap occurs as a streak to the left of the dots d7 to d9. The visibility as a streak is lower in the case illustrated in FIGS. 12A to 12D than in the case illustrated in FIGS. 11A to 11D.

Landing Order of Droplets Skewing After Being Discharged in Third Case

Referring to FIGS. 13A to 13D, a description is given below of a case where droplets skew after being discharged.

FIGS. 13A to 13D are diagrams illustrating the landing order of dots in a solid image in a third case where droplets skew after being discharged, according to the third embodiment of the present disclosure.

The landing timing of the droplets is substantially the same as that in the first embodiment.

In the case illustrated in FIGS. 13A to 13D, the droplets discharged from the nozzle array L2 skew. The dots d7 to d9, which are droplets discharged from the nozzle array L2, land while skewing, for example, rightwards in FIGS. 13A to 13D. Dots d1 to d6 have already landed at both sides in the X-axis direction of the landing position of the skewing droplets. The droplets discharged from the nozzle array L2 are large droplets.

At this time, the dot d7 overlaps the dots d1 and d4 adjacent to the dot d7 in the X-axis direction, resulting in the coalescence of the dots d1, d4, and d7. The dots d1 and d4, which have landed before the dot d7, slightly move. The attraction force acting from both sides of the dot d7 slightly moves the dot d7.

Similarly, the dot d8 overlaps the dots d2 and d5 adjacent to the dot d8 in the X-axis direction, resulting in the coalescence of the dots d2, d5, and d8. The dots d2 and d5, which have landed before the dot d8, slightly move. The attraction force acting from both sides of the dot d8 slightly moves the dot d8. In addition, the dot d8 overlaps the dot d7 in the Y-axis direction and thus moves toward the dot d7.

Similarly, the dot d9 overlaps the dots d3 and d6 adjacent to the dot d9 in the X-axis direction, resulting in the coalescence of the dots d3, d6, and d9. The dots d3 and d6, which have landed before the dot d9, slightly move. The attraction force acting from both sides of the dot d9 slightly moves the dot d9. In addition, the dot d9 overlaps the dot d8 in the Y-axis direction and thus moves toward the dot d8.

Figures 13A, 13B, 13C, 13D:
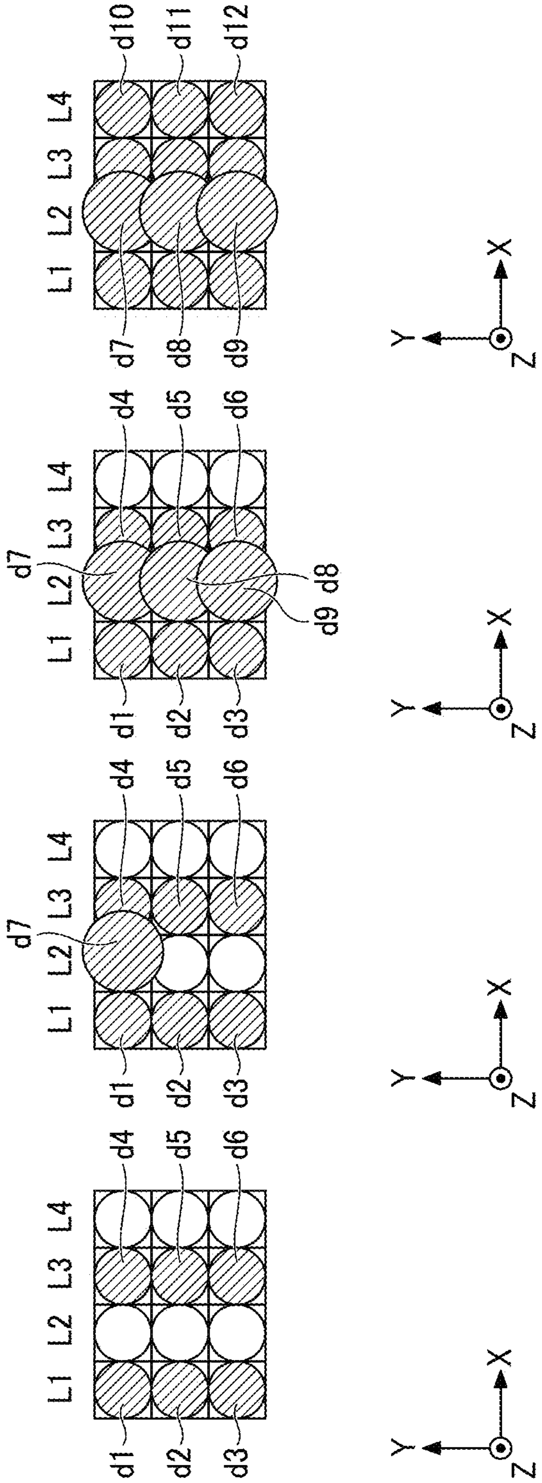
FIGS. 13A to 13D are diagrams illustrating the landing order of dots in a solid image in a third case where droplets skew after being discharged, according to the third embodiment of the present disclosure.

As illustrated in FIG. 13D, after all the dots d1 to d12 land, no gaps as streaks occur at both sides in the X-axis direction of the dots d4 to d6 and the dots d7 to d9. In this case, the overlapping portion is relatively large and exhibits a locally higher concentration than the other portion. However, the recognizability of a black stripe is lower than that of a white stripe in the high-concentration portion where an increased amount of droplets has been discharged. For this reason, the image quality of FIG. 13D is higher than the image quality of FIG. 12D.

Image Forming Apparatus According to Fourth Embodiment

A description is given below of the image forming apparatus 1 according to a fourth embodiment of the present disclosure.

Figure 14:
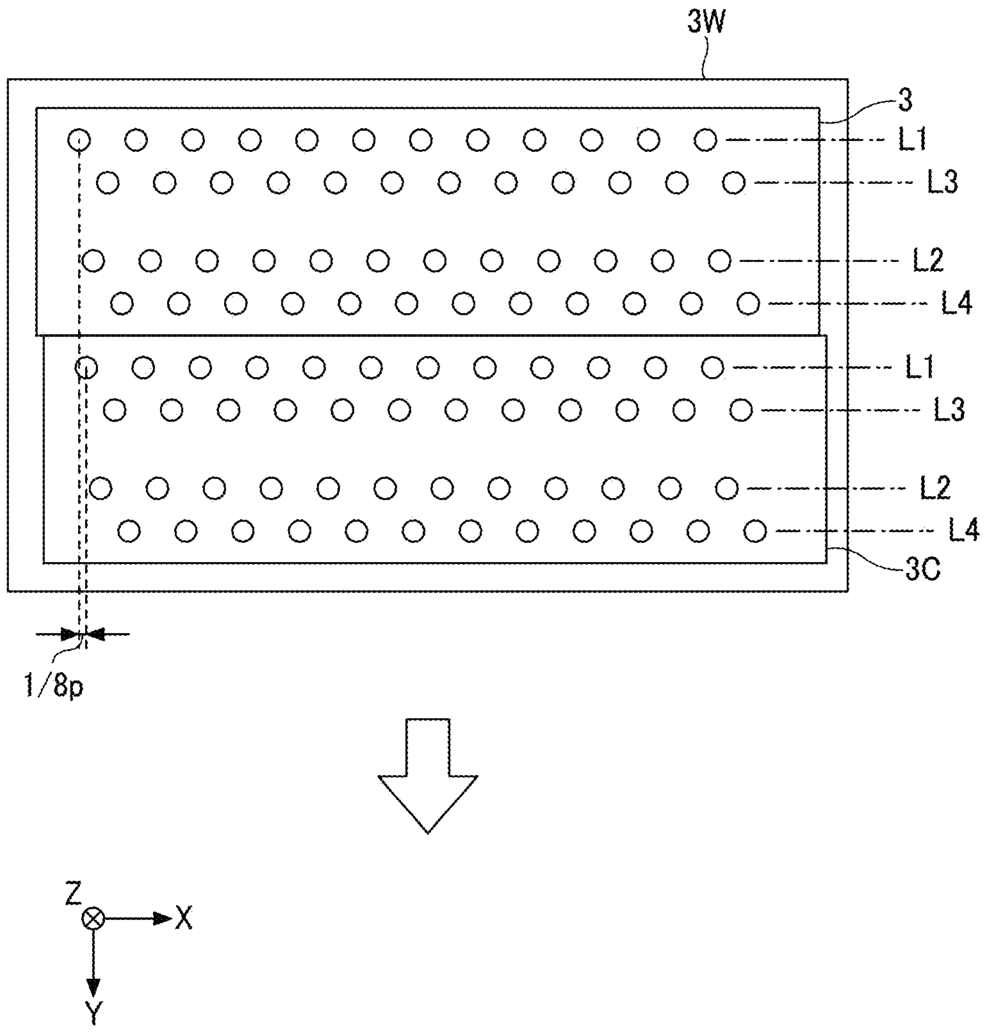
FIG. 14 is a bottom view of a recording head of an image forming apparatus according to a fourth embodiment of the present disclosure.

FIG. 14 is a bottom view of a recording head of the image forming apparatus 1 according to the fourth embodiment of the present disclosure.

The image forming apparatus 1 according to the fourth embodiment is different from the image forming apparatus 1 according to the first embodiment in that the image forming apparatus 1 according to the fourth embodiment includes a dual head 3W, which includes a plurality of recording heads 3 and 3C. Redundant descriptions between the fourth embodiment and the embodiments described above will be omitted below.

For example, in the image forming apparatus 1 as a line head engine, the recording heads 3 and 3C are aligned to achieve high image quality. The recording heads 3 and 3C are aligned in the Y-axis direction to increase the nozzle density.

The dual head 3W includes the recording heads 3 and 3C aligned in the Y-axis direction. The recording heads 3 and 3C have substantially the same structure. The recording head 3C is disposed downstream from the recording head 3 in the conveyance direction of the recording medium P0.

The recording heads 3 and 3C are shifted from each other in the X-axis direction. The nozzles 4 of the recording head 3C are shifted by one-eighth pitch from the nozzles 4 of the recording head 3. For example, when the recording head 3 has a nozzle density of 600 dpi, the dual head 3W has a nozzle density of 1200 dpi.

In this case, the order of discharging droplets follows the arrangement of the nozzle arrays L1, L3, L2, and L4 in this order in the conveyance direction of the recording medium P0. The landing timing of the droplets follows the order of discharging the droplets. The droplets are discharged from the nozzle array L1, the nozzle array L3, the nozzle array L2, and the nozzle array L4 of the recording head 3 in this order, and from the nozzle array L1, the nozzle array L3, the nozzle array L2, and the nozzle array L4 of the recording head 3C in this order. The nozzle array L1 of the recording head 3 is the nozzle array from which the droplets land the earliest among the eight nozzle arrays of the dual head 3W. The nozzle array L4 of the recording head 3C is the nozzle array from which the droplets land the latest among the eight nozzle arrays of the dual head 3W.

For example, when the recording heads 3 and 3C are aligned in the Y-axis direction as in the dual head 3W, the variation in the size of the droplets after being discharged is observed for each of the recording heads 3 and 3C, which are single heads. When assembling the dual head 3W, the recording head 3 that tends to have a larger dot size is arranged as the downstream recording head 3C in the conveyance direction. The recording head 3 having a smaller dot size is arranged as the upstream recording head 3 in the conveyance direction. The dot size of the droplets discharged from the upstream recording head 3 is smaller than the dot size of the droplets discharged from the downstream recording head 3C. The dual head 3W having such a configuration restrains the movement of the dots due to the coalescence and enhances the image quality. In this case, the dot size may be measured by observing flying droplets with a camera or by shooting droplets onto a medium.

Image Forming Apparatus According to Fifth Embodiment

A description is given below of the image forming apparatus 1 according to a fifth embodiment of the present disclosure.

Figure 15:
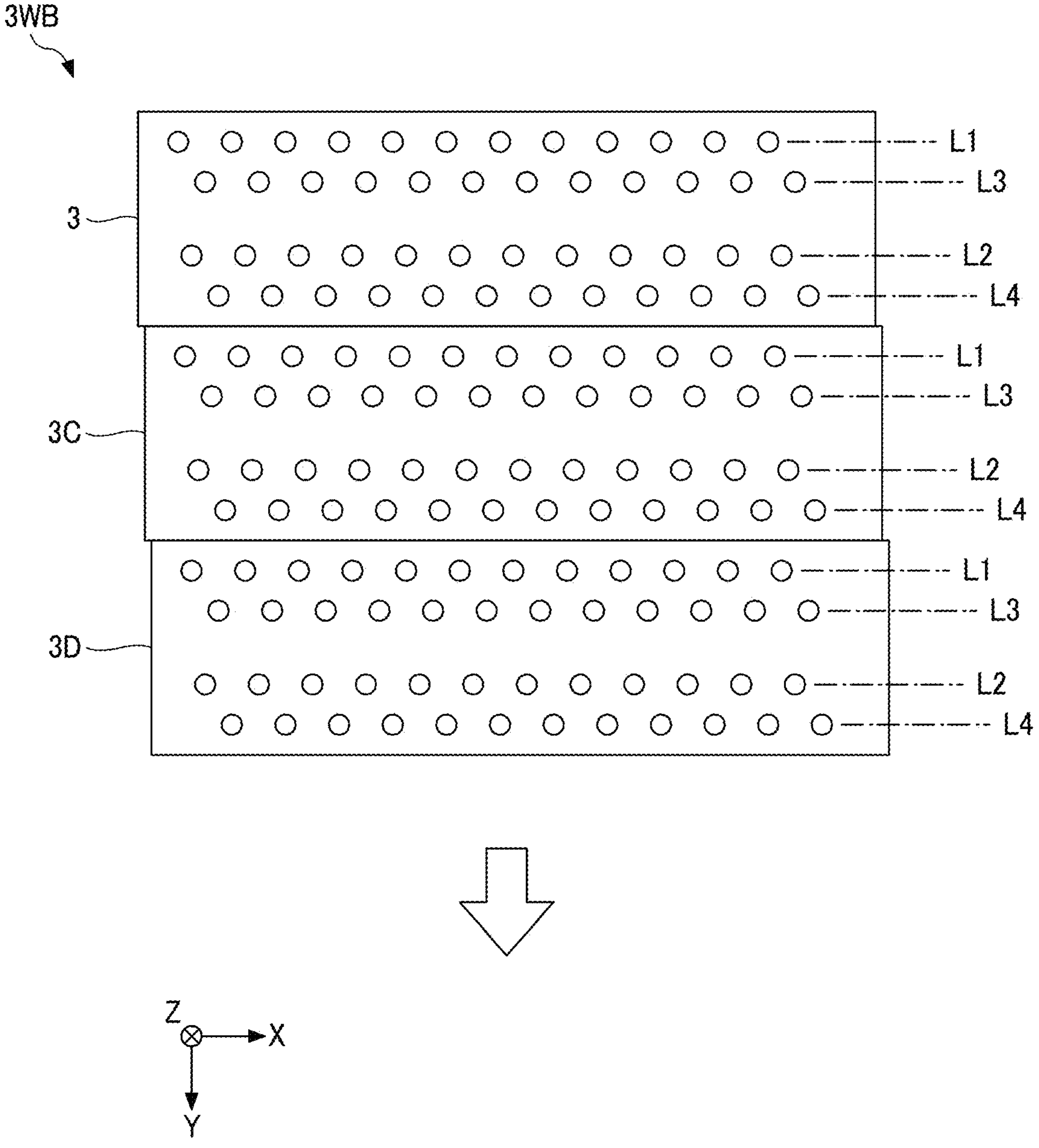
FIG. 15 is a bottom view of a recording head of an image forming apparatus according to a fifth embodiment of the present disclosure.

FIG. 15 is a bottom view of a recording head of the image forming apparatus 1 according to the fifth embodiment of the present disclosure.

The image forming apparatus 1 according to the fifth embodiment is different from the image forming apparatus 1 according to the first embodiment in that the image forming apparatus 1 according to the fifth embodiment includes a head 3WB, which includes a plurality of recording heads 3, 3C, and 3D. Redundant descriptions between the fifth embodiment and the embodiments described above will be omitted below.

The head 3WB includes the recording heads 3, 3C, and 3D aligned in the Y-axis direction. The recording heads 3, 3C, and 3D have substantially the same structure. The recording head 3D is disposed downstream from the recording head 3C in the conveyance direction of the recording medium P0. The recording heads 3, 3C, and 3D are shifted from each other in the X-axis direction.

In the head 3WB, the droplets are discharged sequentially from the nozzle array L1 of the upstream recording head 3 in the conveyance direction of the recording medium P0.

The nozzle array L1 of the recording head 3 is the nozzle array from which the droplets land the earliest among the twelve nozzle arrays of the dual head 3WB. The nozzle array L4 of the recording head 3D is the nozzle array from which the droplets land the latest among the twelve nozzle arrays of the dual head 3WB.

The image forming apparatus 1 according to the fifth embodiment achieves operational advantages like the operational advantages achieved by the image forming apparatus 1 according to the first embodiment.

Image Forming Apparatus According to Sixth Embodiment

A description is given below of the image forming apparatus 1 according to a sixth embodiment of the present disclosure.

Figure 16:
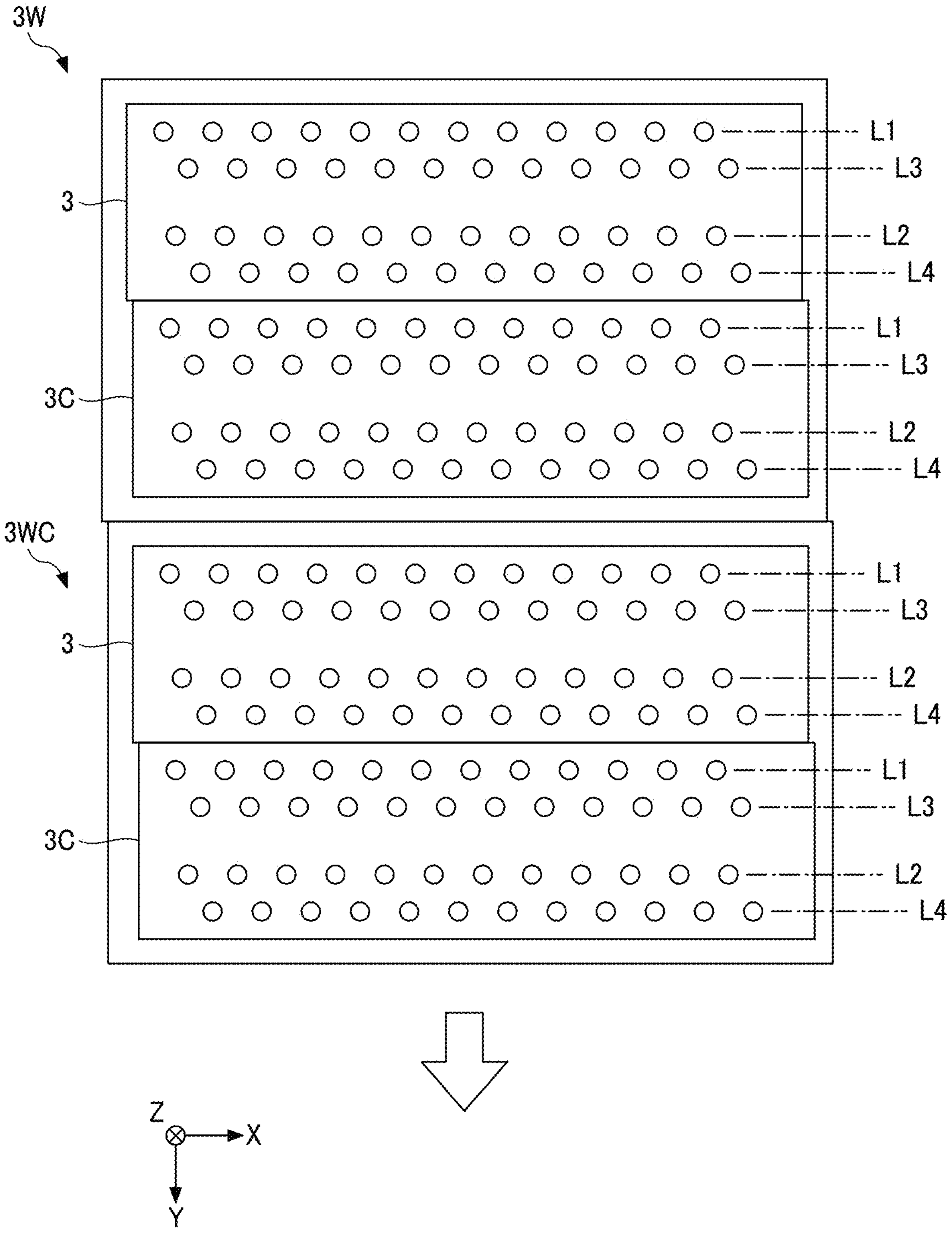
FIG. 16 is a bottom view of a recording head of an image forming apparatus according to a sixth embodiment of the present disclosure.

FIG. 16 is a bottom view of a recording head of the image forming apparatus 1 according to the sixth embodiment of the present disclosure.

The image forming apparatus 1 according to the sixth embodiment is different from the image forming apparatus 1 according to the fourth embodiment in that the image forming apparatus 1 according to the sixth embodiment includes a plurality of dual heads 3W and 3WC. Redundant descriptions between the sixth embodiment and the embodiments described above will be omitted below.

The dual heads 3W and 3WC are aligned in the Y-axis direction. The dual heads 3W and 3WC have substantially the same structure. The dual head 3WC is disposed downstream from the dual head 3W in the conveyance direction of the recording medium P0. The dual heads 3W and 3WC are shifted from each other in the X-axis direction.

In the dual heads 3W and 3WC, the droplets are discharged sequentially from the nozzle array L1 of the upstream recording head 3 in the conveyance direction of the recording medium P0.

The nozzle array L1 of the recording head 3 of the dual head 3W is the nozzle array from which the droplets land the earliest among the sixteen nozzle arrays of the dual heads 3W and 3WC. The nozzle array L4 of the recording head 3C of the dual head 3WC is the nozzle array from which the droplets land the latest among the sixteen nozzle arrays of the dual heads 3W and 3WC.

The image forming apparatus 1 according to the sixth embodiment achieves operational advantages like the operational advantages achieved by the image forming apparatus 1 according to the first embodiment.

Serial Head

The image forming apparatus 1 is not limited to an image forming apparatus including a line head in which the nozzle arrays L1 to L4 extend in a direction intersecting the conveyance direction of the recording medium P0. In the image forming apparatus 1, the carriage including the recording head 3 may include a serial head that moves in a direction intersecting the conveyance direction of the recording medium P0. The nozzle arrays L1 to L4 of the recording head 3 mounted on the carriage are arranged along the conveyance direction. For example, the nozzle array L1 of the recording head 3 is ahead in the movement direction of the carriage whereas the nozzle array L4 is behind in the movement direction of the carriage. In this configuration, the nozzle array L1 is the nozzle array from which the droplets land the earliest whereas the nozzle array L4 is the nozzle array from which the droplets land the latest.

Processing Circuit

Each of the functions of the embodiments described above may be implemented by one or more processing circuits or circuitry. The processing circuit or circuitry herein includes a processor programmed to execute the functions by software such as a processor implemented by an electronic circuit. The processing circuit or circuitry also includes devices such as an application-specific integrated circuit (ASIC), a digital signal processor (DSP), a field programmable gate array (FPGA), and conventional circuit modules arranged to perform the recited functions.

Liquid Discharge Apparatus

Although the image forming apparatus 1 is described as an example of the liquid discharge apparatus in the embodiments described above, the liquid discharge apparatus is not limited to the image forming apparatus 1. The liquid discharge apparatus is not limited to an apparatus that discharges ink droplets. The liquid discharge apparatus may be an apparatus that discharges droplets of another type of liquid.

A description is given below of several aspects of the present disclosure.

According to a first aspect, a liquid discharge apparatus includes a plurality of nozzle arrays and a control unit. The nozzle arrays discharge a plurality of droplets having different volumes onto a recording medium at mutually different times. The control unit controls a discharge operation to discharge the droplets. The control unit causes a nozzle array of the nozzle arrays to discharge a droplet, of the droplets, of a first reference amount, and causes another nozzle array of the nozzle arrays to discharge a droplet, of the droplets, of a second reference amount greater than the first reference amount to land later than the droplet of the first reference amount.

According to a second aspect, in the liquid discharge apparatus of the first aspect, the nozzle arrays are disposed at different positions in a first direction. The nozzle arrays include a plurality of nozzles aligned in a second direction intersecting the first direction. The nozzles can discharge the droplets including a small droplet and a large droplet greater in volume than the small droplet. The nozzle arrays discharge the droplets to land on the recording medium at mutually different times.

According to a third aspect, in the liquid discharge apparatus of the first or second aspect, the nozzles can discharge the droplets including a medium droplet greater in volume than the small droplet and smaller in volume than the large droplet. The control unit discharges the small droplet to land on one of a first position and a second position adjacent to each other in the first direction on the recording medium before discharging the medium droplet or the large droplet to land on another one of the first position and the second position.

According to a fourth aspect, in the liquid discharge apparatus of any one of the first to third aspects, the control unit causes a nozzle array of the nozzle arrays to discharge the large droplet, the nozzle array being a nozzle array from which the droplet lands the latest among the nozzle arrays.

According to a fifth aspect, in the liquid discharge apparatus of any one of the first to third aspects, the nozzle arrays include a first nozzle array, a second nozzle array, and a third nozzle array. The first nozzle array discharges a droplet of the droplets to land the earliest among the nozzle arrays. The second nozzle array discharges a droplet of the droplets to land the latest among the nozzle arrays. The third nozzle array discharges a droplet of the droplets to land later than the droplet landing from the first nozzle array and earlier than the second droplet landing from the second nozzle array. When causing the second nozzle array to discharge the large droplet and causing the first nozzle array or the third nozzle array to discharge the large droplet, the control unit controls the discharge operation to cause the first nozzle array to discharge the large droplet without selecting the third nozzle array.

According to a sixth aspect, in the liquid discharge apparatus of any one of the first to fifth aspects, the nozzle arrays include two nozzle arrays: a nozzle array including the nozzles to discharge droplets of the droplets with a small variation in the amount discharged, and another nozzle array including the nozzles to discharge droplets of the droplets with a large variation in the amount discharged. The droplets discharged from the nozzle array with a large variation in the amount discharged land later than the droplets discharged from the other nozzle array with a small variation in the amount discharged.

According to a seventh aspect, in the liquid discharge apparatus of the sixth aspect, the first direction is a conveyance direction in which the recording medium is conveyed. The nozzle array with a large variation in the amount discharged is disposed downstream from the nozzle array with a small variation in the amount discharged in the conveyance direction.

According to an eighth aspect, in the liquid discharge apparatus of any one of the first to seventh aspects, the nozzle arrays include two nozzle arrays: a nozzle array including a first nozzle to discharge a droplet of the droplets, the droplet slightly skewing after being discharged, and another nozzle array including a second nozzle to discharge a droplet of the droplets, the droplet greatly skewing after being discharged. The droplet discharged from the second nozzle lands later than the droplet discharged from the first nozzle.

According to a ninth aspect, in the liquid discharge apparatus of the eighth aspect, the first direction is a conveyance direction in which the recording medium is conveyed. The nozzle array including the second nozzle is disposed most downstream in the conveyance direction.

According to a tenth aspect, in the liquid discharge apparatus of the eighth aspect, the control unit controls the discharge operation to cause the second nozzle to discharge the large droplet by a greater amount than an amount of the large droplet discharged from the first nozzle.

According to an eleventh aspect, the liquid discharge apparatus of any one of the first to tenth aspects further includes a plurality of discharge heads each including a nozzle array of the plurality of nozzle arrays. The discharge heads overlap each other when viewed in the first direction.

According to a twelfth aspect, a non-transitory recording medium storing a plurality of instructions which, when executed by one or more processors, causes the one or more processors to perform a method of controlling a discharge operation to cause a plurality of nozzle arrays to discharge a plurality of droplets having different volumes onto a recording medium at mutually different times. The method includes causing a nozzle array of the nozzle arrays to discharge a droplet, of the droplets, of a first reference amount, and causing another nozzle array of the nozzle array to discharge a droplet, of the droplets, of a second reference amount greater than the first reference amount to land later than the droplet of the first reference amount.

According to a thirteenth aspect, a liquid discharging method for causing a plurality of nozzle arrays to discharge a plurality of droplets having different volumes onto a recording medium at mutually different times includes causing a nozzle array of the nozzle arrays to discharge a droplet, of the droplets, of a first reference amount, and causing another nozzle array of the nozzle arrays to discharge a droplet, of the droplets, of a second reference amount greater than the first reference amount to land later than the droplet of the first reference amount.

According to a fourteenth aspect, a method for producing a head unit includes assembling and disposing. The assembling is assembling a plurality of discharge heads each including a nozzle array. The nozzle array includes a plurality of nozzles. The discharge heads include a first discharge head and a second discharge head. The first discharge head includes the nozzles to discharge droplets with a small variation in the amount discharged. The second discharge head includes the nozzles to discharge droplets with a large variation in the amount discharged. The disposing is disposing the first discharge head and the second discharge head downstream from the first discharge head in a conveyance direction in which a recording medium is conveyed.

According to a fifteenth aspect, a method for producing a head unit includes assembling and disposing. The assembling is assembling a plurality of discharge heads each including a nozzle array. The nozzle array includes a plurality of nozzles. The discharge heads include a first discharge head and a second discharge head. The first discharge head includes a nozzle to discharge a droplet that slightly skews after being discharged. The second discharge head includes a nozzle to discharge a droplet that greatly skews after being discharged. The disposing is disposing the first discharge head and the second discharge head downstream from the first discharge head in a conveyance direction in which a recording medium is conveyed.

According to one or more aspects of the present disclosure, a liquid discharge apparatus prevents the movement of dots due to the interference of droplets, without correcting the dot size.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

a plurality of nozzle arrays to discharge a plurality of droplets onto a recording medium at mutually different times, wherein the plurality of nozzle arrays are located at different positions in a first direction, and the plurality of nozzle arrays include a plurality of nozzles aligned in a second direction intersecting the first direction; and circuitry configured to control a discharge operation to discharge the plurality of droplets, the circuitry being configured to:

cause a nozzle array of the plurality of nozzle arrays to discharge a small droplet, of the plurality of droplets, of a first reference amount;

cause another nozzle array of the plurality of nozzle arrays to discharge a large droplet, of the plurality of droplets, of a second reference amount greater than the first reference amount to land later than the small droplet of the first reference amount; and discharge the small droplet to land on one of a first position and second position adjacent to each other in the first direction on the recording medium before discharging the large droplet to land on another one of the first position and the second position.

2. The liquid discharge apparatus according to claim 1, wherein the plurality of nozzles discharge the plurality of droplets including a medium droplet greater in volume than the small droplet and smaller in volume than the large droplet, and wherein the circuitry is configured to discharge the small droplet to land on one of a third position and a fourth position adjacent to each other in the first direction on the recording medium before discharging the medium droplet or the large droplet to land on another one of the third position and the fourth position.

3. The liquid discharge apparatus according to claim 1, wherein the circuitry is configured to cause a nozzle array of the plurality of nozzle arrays to discharge the large droplet, the nozzle array being a nozzle array from which the droplet lands latest among the plurality of nozzle arrays.

4. The liquid discharge apparatus according to claim 1, wherein the plurality of nozzle arrays include:

a first nozzle array to discharge a droplet of the plurality of droplets to land earliest among the plurality of nozzle arrays;

a second nozzle array to discharge a droplet of the plurality of droplets to land latest among the plurality of nozzle arrays; and a third nozzle array to discharge a droplet of the plurality of droplets to land later than the droplet landing from the first nozzle array and earlier than the droplet landing from the second nozzle array, and wherein, when causing the second nozzle array to discharge the large droplet and causing the first nozzle array or the third nozzle array to discharge the large droplet, the circuitry is configured to control the discharge operation to cause the first nozzle array to discharge the large droplet without selecting the third nozzle array.

5. The liquid discharge apparatus according to claim 1, further comprising a plurality of discharge heads each including a nozzle array of the plurality of nozzle arrays, the plurality of discharge heads overlapping each other when viewed in the first direction.

6. The liquid discharge apparatus according to claim 1, wherein the plurality of nozzles discharge the plurality of droplets including a medium droplet greater in volume than the small droplet and smaller in volume than the large droplet.

7. The liquid discharge apparatus according to claim 1, wherein the plurality of nozzle arrays include:

a first nozzle array to discharge a droplet of the plurality of droplets to land earliest among the plurality of nozzle arrays;

a second nozzle array to discharge a droplet of the plurality of droplets to land latest among the plurality of nozzle arrays; and a third nozzle array to discharge a droplet of the plurality of droplets to land later than the droplet landing from the first nozzle array and earlier than the droplet landing from the second nozzle array.

8. The liquid discharge apparatus according to claim 1, wherein the plurality of nozzle arrays include:

a nozzle array including nozzles of the plurality of nozzles to discharge droplets of the plurality of droplets with a small variation in amount discharged; and another nozzle array including nozzles of the plurality of nozzles to discharge droplets of the plurality of droplets with a large variation in amount discharged, and wherein the droplets discharged from said another nozzle array land later than the droplets discharged from the nozzle array.

9. The liquid discharge apparatus according to claim 8, wherein the first direction is a conveyance direction in which the recording medium is conveyed, and wherein said nozzle array is disposed downstream from the nozzle array in the conveyance direction.

10. The liquid discharge apparatus according to claim 8, wherein the first direction is a conveyance direction in which the recording medium is conveyed.

11. The liquid discharge apparatus according to claim 1, wherein the plurality of nozzle arrays include:

a nozzle array including a first nozzle to discharge a droplet of the plurality of droplets, the droplet slightly skewing after being discharged; and another nozzle array including a second nozzle to discharge a droplet of the plurality of droplets, the droplet skewing after being discharged, and wherein the droplet discharged from the second nozzle lands later than the droplet discharged from the first nozzle.

12. The liquid discharge apparatus according to claim 11, wherein the first direction is a conveyance direction in which the recording medium is conveyed, and wherein said another nozzle array is disposed most downstream in the conveyance direction.

13. The liquid discharge apparatus according to claim 11, wherein the circuitry is configured to control the discharge operation to cause the second nozzle to discharge the large droplet by a greater amount than an amount of the large droplet discharged from the first nozzle.

14. A liquid discharging method for causing a plurality of nozzle arrays to discharge a plurality of droplets onto a recording medium at mutually different times, wherein the plurality of nozzle arrays are located at different positions in a first direction, and the plurality of nozzle arrays include a plurality of nozzles aligned in a second direction intersecting the first direction, the method comprising:

causing a nozzle array of the plurality of nozzle arrays to discharge a small droplet, of the plurality of droplets, of a first reference amount;

causing another nozzle array of the plurality of nozzle arrays to discharge a large droplet, of the plurality of droplets, of a second reference amount greater than the first reference amount to land later than the small droplet of the first reference amount; and discharging the small droplet to land on one of a first position and second position adjacent to each other in the first direction on the recording medium before discharging the large droplet to land on another one of the first position and the second position.

* * * * *